US012122874B2

(12) United States Patent
Lynd et al.

(10) Patent No.: US 12,122,874 B2
(45) Date of Patent: Oct. 22, 2024

(54) CATALYSTS FOR RING OPENING POLYMERIZATION

(71) Applicant: BOARD OF REGENTS, THE UNIVERSITY OF TEXAS SYSTEM, Austin, TX (US)

(72) Inventors: Nathaniel A. Lynd, Austin, TX (US); Jennifer Imbrogno, Austin, TX (US); Robert C. Ferrier, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 752 days.

(21) Appl. No.: 17/264,413

(22) PCT Filed: Jul. 30, 2019

(86) PCT No.: PCT/US2019/044087
§ 371 (c)(1),
(2) Date: Jan. 29, 2021

(87) PCT Pub. No.: WO2020/028332
PCT Pub. Date: Feb. 6, 2020

(65) Prior Publication Data
US 2022/0112334 A1  Apr. 14, 2022

Related U.S. Application Data

(60) Provisional application No. 62/711,866, filed on Jul. 30, 2018.

(51) Int. Cl.
*C08F 2/46* (2006.01)
*B01J 31/12* (2006.01)
*C08F 2/50* (2006.01)
*C08G 61/04* (2006.01)
*C08G 63/82* (2006.01)
*C08G 64/30* (2006.01)
*C08G 65/12* (2006.01)

(52) U.S. Cl.
CPC .............. *C08G 65/12* (2013.01); *B01J 31/12* (2013.01); *C08G 63/823* (2013.01); *C08G 64/30* (2013.01)

(58) Field of Classification Search
CPC .... C08G 64/30; C08G 64/0208; C08G 65/10; C08G 65/12; C08G 63/08; C08G 63/823; B01J 31/12
USPC .................................. 522/166, 162, 1; 520/1
See application file for complete search history.

(56) References Cited

U.S. PATENT DOCUMENTS 4,451,618 A * 5/1984 Okamoto ............ C08G 65/04
525/379
2015/0018493 A1  1/2015 Mehrkhodavandi et al.
2018/0118880 A1  5/2018 Chen et al.

OTHER PUBLICATIONS

Akatsuka et al., High-Speed "Immortal" Polymerization of Epoxides Initiated with Aluminum Porphyrin. Acceleration of Propagation and Chain-Transfer Reactions by a Lewis Acid, 1994, Macromolecules, 27, 2820-2825 (Year: 1994).*
Rodriguez et al., Ring-Opening Polymerization of Epoxides: Facile Pathway to Functional Polyethers via a Versatile Organoaluminum Initiator, Apr. 4, 2017, Macromolecules, 50, 3121-3130 (Year: 2017).*
Ahmed, S. M.; Poater, A.; Childers, M. I.; Widger, P. C. B.; LaPointe, A. M.; Lobkovsky, E. B.; Coates, G. W.; Cavallo, L. Enantioselective Polymerization of Epoxides Using Biaryl-Linked Bimetallic Cobalt Catalysts: a Mechanistic Study. J. Am. Chem. Soc. 2013, 135, 18901-18911.
Aida, T.; Inoue, S. Living Polymerization of Epoxide Catalyzed by the Porphyrin-Chlorodiethylaluminum System. Structure of the Living End. Macromolecules 1981, 14, 1166-1169.
Aida, T.; Inoue, S. Living Polymerization of Epoxides with Metalloporphyrin and Synthesis of Block Copolymers with Controlled Chain Lengths. Macromolecules 1981, 14, 1162-1166.
Aida, T.; Mizuta, R.; Yoshida, Y.; Inoue, S. Polymerization of Epoxides Catalysed by Metalloporphine. Makromol. Chem. 1981, 182, 1073-1079.
Aida, T.; Wada, K.; Inoue, S. Copolymerization of Epoxides by Aluminum Porphyrin—Reactivity of (Porphinato)Aluminum Alkoxide as Growing Species. Macromolecules 1987, 20, 237-241.
Akatsuka, M.; Aida, T.; Inoue, S. High-Speed "Immortal" Polymerization of Epoxides Initiated with Aluminum Porphyrin. Acceleration of Propagation and Chain-Transfer Reactions by a Lewis Acid. Macromolecules 1994, 27, 2820-2825.
Asano, S.; Aida, T.; Inoue, S. "Immortal" Polymerization. Polymerization of Epoxide Catalysed by an Aluminium Porphyrin-Alcohol System. J. Chem. Soc., Chem. Commun. 1985, 1148-1149.
Ault, B. S. Matrix Isolation Study of the Reactions of Trimethylaluminum with Ammonia. J. Phys. Chem. 1992, 96, 7908-7912.
Bessac, F.; Frenking, G. Chemical Bonding in Phosphane and Amine Complexes of Main Group Elements and Transition Metals †. Inorg. Chem. 2006, 45, 6956-6964.
Billouard, C.; Carlotti, S.; Desbois, P.; Deffieux, A. "Controlled" High-Speed Anionic Polymerization of Propylene Oxide Initiated by Alkali Metal Alkoxide/Trialkylaluminum Systems. Macromolecules 2004, 37, 4038-4043.
Biswas, K.; Chapron, A.; Cooper, T.; Fraser, P. K.; Novak, A.; Prieto, O.; Woodward, S. Dabbling with Air-Stable Organoaluminum Species. Pure & Appl. Chem. 2006, 78, 511-518.
Bradley, D. C.; Coumbarides, G.; Harding, I. S.; Hawkes, G. E.; Maia, I. A.; Motevalli, M. Synthesis and Characterisation of Trialkylaluminium-Dialkylamine Adducts: X-Ray Diffraction and 1H Nmr Studies. J. Chem. Soc., Dalton Trans. 1999, 3553-3558.
Carlotti, S.; Billouard, C.; Gautriaud, E.; Desbois, P.; Deffieux, A. Activation Mechanisms of Trialkylaluminum in Alkali Metal Alkoxides or Tetraalkylammonium Salts / Propylene Oxide Controlled Anionic Polymerization. Macromol. Symp. 2005, 226, 61-68.

(Continued)

*Primary Examiner* — Jessica Whiteley
(74) *Attorney, Agent, or Firm* — Meunier Carlin & Curfman LLC

(57) ABSTRACT

Disclosed herein are catalyst systems useful for a wide range of ring opening polymerization processes. Epoxides, oxetanes, lactones and cyclic carbonates are all suitable substrates for the ring opening polymerization.

18 Claims, 9 Drawing Sheets

(56) References Cited

OTHER PUBLICATIONS

Childers, M. I.; Vitek, A. K.; Morris, L. S.; Widger, P. C. B.; Ahmed, S. M.; Zimmerman, P. M.; Coates, G. W. Isospecific, Chain Shuttling Polymerization of Propylene Oxide Using a Bimetallic Chromium Catalyst: A New Route to Semicrystalline Polyols. J. Am. Chem. Soc. 2017, 139, 11048-11054.

Chuma, A.; Horn, H. W.; Swope, W. C.; Pratt, R. C.; Zhang, L.; Lohmeijer, B. G. G.; Wade, C. G.; Waymouth, R. M.; Hedrick, J. L.; Rice, J. E. The Reaction Mechanism for the Organocatalytic Ring-Opening Polymerization of L-Lactide Using a Guanidine-Based Catalyst: Hydrogen-Bonded or Covalently Bound? J. Am. Chem. Soc. 2008, 130, 6749-6754.

CrysAlisPro. Agilent Technologies (2013). Agilent Technologies UK Ltd., Oxford, UK, SuperNova CCD System, CrysAlicPro Software System, 1.171.38.46.

David A Atwood; Francois P Gabbai; Jianliang Lu; Michael P Remington; Drew Rutherford, A.; Mukund P Sibi. Synthesis and Structural Characterization of Chiral Amine Alcohol Complexes of Aluminum. Organometallics 1996, 15, 2308-2313.

Dias, E. L.; Nguyen, S. T.; Grubbs, R. H. Well-Defined Ruthenium Olefin Metathesis Catalysts: Mechanism and Activity. J. Am. Chem. Soc. 1997, 119, 3887-3897.

Dudev, T.; Lim, C. Ring Strain Energies From Ab Initio Calculations. J. Am. Chem. Soc. 1998, 120, 4450-4458.

Farrugia, WinGX 1.64. (1999). An Integrated System of Windows Programs for the Solution, Refinement and Analysis of Single Crystal X-ray Diffraction Data. J. Appl. Cryst. 32. 837-838.

Ferrier, R. C.; Imbrogno, J.; Rodriguez, C. G.; Chwatko, M.; Meyer, P. W.; Lynd, N. A. Four-Fold Increase in Epoxide Polymerization Rate with Change of Alkyl-Substitution on Mono-M-Oxo-Dialuminum Initiators. Polym. Chem. 2017, 8, 4503-4511.

Gervais, M.; Labbé, A.; Carlotti, S .; Deffieux, A. Direct Synthesis of A-Azido,Ω-Hydroxypolyethers by Monomer-Activated Anionic Polymerization. Macromolecules 2009, 42, 2395-2400.

Ghosh, S.; Lund, H.; Jiao, H .; Mejía, E. Rediscovering the Isospecific Ring-Opening Polymerization of Racemic Propylene Oxide with Dibutylmagnesium. Macromolecules 2017, 50, 1245-1250.

Hans, M.; Keul, H.; Moeller, M. Chain Transfer Reactions Limit the Molecular Weight of Polyglycidol Prepared via Alkali Metal Based Initiating Systems. Polymer 2009, 50, 1103-1108.

Hillmyer, Marc A.; SonBinh T Nguyen, A.; Grubbs, R. H. Utility of a Ruthenium Metathesis Catalyst for the Preparation of End-Functionalized Polybutadiene. Macromolecules 1997, 30, 718-721.

Hirahata, W.; Thomas, R. M.; Lobkovsky, E. B.; Coates, G. W. Enantioselective Polymerization of Epoxides: A Highly Active and Selective Catalyst for the Preparation of Stereoregular Polyethers and Enantiopure Epoxides. J. Am. Chem. Soc. 2008, 130, 17658-17659.

Kiesewetter, M. K.; Shin, E. J.; Hedrick, J. L.; Waymouth, R. M. Organocatalysis: Opportunities and Challenges for Polymer Synthesis. Macromolecules 2010, 43, 2093-2107.

Lee, B. F.; Wolffs, M.; Delaney, K. T.; Sprafke, J. K.; Leibfarth, F. A.; Hawker, C. J.; Lynd, N. A. Reactivity Ratios and Mechanistic Insight for Anionic Ring-Opening Copolymerization of Epoxides. Macromolecules 2012, 45, 3722-3731.

Lohmeijer, B. G. G.; Pratt, R. C.; Leibfarth, F.; Logan, J. W.; Long, D. A.; Dove, A. P.; Nederberg, F.; Choi, J.; Wade, C.; Waymouth, R. M.; Hedrick, J. L. Guanidine and Amidine Organocatalysts for Ring-Opening Polymerization of Cyclic Esters. Macromolecules 2006, 39, 8574-8583.

Lustig, C.; Mitzel, N. W. Molecularly Simple Dimethylaminomethyl Compounds of Aluminum, Gallium, and Indium. Organometallics 2003, 22, 242-249.

Morris, L. S.; Childers, M. I.; Coates, G. W. Bimetallic Chromium Catalysts with Chain Transfer Agents: A Route to Isotactic Poly(propylene oxide)s with Narrow Dispersities. Angew. Chem. Int. Ed. 2018, 57, 5731-5734.

Obermeier, B.; Frey, H. Poly(ethylene glycol-co-allyl glycidyl ether)s: A Peg-Based Modular Synthetic Platform for Multiple Bioconjugation. Bioconjugate Chem. 2011, 22, 436-444.

Obermeier, B.; Wurm, F.; Mangold, C.; Frey, H. Multifunctional Poly(ethylene glycol)s. Angew. Chem. Int. Ed. 2011, 50, 7988-7997.

Peretti, K. L.; Ajiro, H.; Cohen, C. T.; Lobkovsky, E. B.; Coates, G. W. A Highly Active, Isospecific Cobalt Catalyst for Propylene Oxide Polymerization. J. Am. Chem. Soc. 2005, 127, 11566-11567.

Pfeiffer, M.; Murso, A.; Mahalakshmi, L.; Moigno, D.; Kiefer, W.; Stalke, D. Experimental and Computational Study on a Variety of Structural Motifs and Coordination Modes in Aluminium Complexes of Di(2-pyridyl)amides and—Phosphanides. Chemische Berichte 2002, 2002, 3222-3234.

Rejsek, V.; Sauvanier, D.; Billouard, C.; Desbois, P.; Deffieux, A.; Carlotti, S. Controlled Anionic Homo- and Copolymerization of Ethylene Oxide and Propylene Oxide by Monomer Activation. Macromolecules 2007, 40, 6510-6514.

Rodriguez, C. G.; Ferrier, R. C., Jr; Helenic, A.; Lynd, N. A. Ring-Opening Polymerization of Epoxides: Facile Pathway to Functional Polyethers via a Versatile Organoaluminum Initiator. Macromolecules 2017, 50, 3121-3130.

Roos, K.; Carlotti, S. Grignard-Based Anionic Ring-Opening Polymerization of Propylene Oxide Activated by Triisobutylaluminum. Eur. Polym. J. 2015, 70, 240-246.

Sheldrick, G. M. (2015). SHELXL-2016/6. Program for the Refinement of Crystal Structures. Acta Cryst., C71, 9-18.

SHELXT. Sheldrick, G. M. (2015) Acta. Cryst. A71, 3-8.

Spek, A. L. (2009). Platon, A Multipurpose Crystallographic Tool. Utrecht University, The Netherlands. Acta Cryst. D65, 148-155.

Tang, L.; Wasserman, E. P.; Neithamer, D. R.; Krystosek, R. D.; Cheng, Y.; Price, P. C.; He, Y.; Emge, T. J. Highly Active Catalysts for the Ring-Opening Polymerization of Ethylene Oxide and Propylene Oxide Based on Products of Alkylaluminum Compounds with Bulky Tetraphenol Ligands. Macromolecules 2008, 41, 7306-7315.

Trinh, C.; Bodensteiner, M.; Virovets, A. V.; Peresypkina, E. V.; Scheer, M.; Matveev, S. M.; Timoshkin, A. Y. Chelating Ionic Versus Bridged Molecular Structures of Group 13 Metal Complexes with Bidentate Ligands. Polyhedron 2010, 29, 414-424.

Vandenberg, E. J. Organometallic Catalysts for Polymerizing Monosubstituted Epoxides. J. Polym. Sci. Part A: Polym. Chem. 1960, 47, 486-489.

Wang, J.-S.; Matyjaszewski, K. Controlled/"Living" Radical Polymerization. Atom Transfer Radical Polymerization in the Presence of Transition-Metal Complexes. J. Am. Chem. Soc. 1995, 117, 5614-5615.

Wasserman, E. P.; Annis, I.; Chopin, L. J.; Price, P. C.; Petersen, J. L.; Abboud, K. A. Ethylene Oxide Polymerization Catalyzed by Aluminum Complexes of Sulfur- Bridged Polyphenols. Macromolecules 2005, 38, 322-333.

Widger, P. C. B.; Ahmed, S. M.; Hirahata, W.; Thomas, R. M.; Lobkovsky, E. B.; Coates, G. W. Isospecific Polymerization of Racemic Epoxides: A Catalyst System for the Synthesis of Highly Isotactic Polyethers. Chem. Commun. 2010, 46, 2935- 2937.

Wilson, International Tables for X-ray Crystallography (1992). vol. C, Tables 4.2.6.8 and 6.1.1.4, A, editor, Boston: Kluwer Academic Press, A49, 371-373.

Yu, G.-E .; Heatley, F.; Booth, C.; Blease, T. G. Anionic Copolymerisation of Ethylene Oxide and Propylene Oxide. Investigation of Double-Bond Content by NMR Spectroscopy. Eur. Polym. J. 1995, 31, 589-593.

Yu, G.- E.; Heatley, F.; Booth, C.; Blease, T. G. Anionic Polymerization of Propylene Oxide: Isomerization of Allyl Ether to Propenyl Ether End Groups. J. Polym. Sci. Part A: Polym. Chem. 1994, 32, 1131-1135.

Zhang, X.; Jones, G. O.; Hedrick, J. L.; Waymouth, R. M. Fast and Selective Ring-Opening Polymerizations by Alkoxides and Thioureas. Nature Chemistry 2016, 8, 1047-1053.

International Preliminary Report on Patentability issued for Application No. PCT/US2019/044087, dated Feb. 11, 2021.

Dechy-Cabaret, O et al., Controlled Ring-Opening Polymerization of Lactide and Glycolide, Chemical Reviews 104, pp. 6147-6176, Apr. 26, 2004.

(56) References Cited

OTHER PUBLICATIONS

Dagorne, S et al., Gallium and indium complexes for ring-opening polymerization of cyclic esters, esters and carbonates, Coordination Chemistry Reviews, 257 (11-12), pp. 1869-1886, Dec. 6, 2013.
Fuoco, T et al., Aluminum Alkyl Complexes Bearing Salicylaldiminato Ligands: Versatile Initiators in the Ring-Opening Polymerization of Cyclic Esters, Catalysts 7, Feb. 16, 2017.
PUBCHEM CID 20656041, pp. 1-7, Create Date: Dec. 5, 2007.
PUBCHEM CID 44144668, pp. 1-6, Create Date: Aug. 20, 2009.
PUBCHEM CID 91339568, pp. 1-6 Create Date: Mar. 17, 2015.
International Search Report and Written Opinion for International Application No. PCT/US2019/044087 dated Oct. 17, 2019.

* cited by examiner

CATALYSTS FOR RING OPENING POLYMERIZATION

CROSS-REFERENCE TO RELATED APPLICATION

This application is a national stage application filed under 35 U.S.C. § 371 of PCT/US2019/044087 filed Jul. 30, 2019, which claims the benefit of U.S. Provisional Application 62/711,866, filed on Jul. 30, 2018, the contents of which are hereby incorporated in their entireties.

FIELD OF THE INVENTION

The invention is directed to catalytic systems for ring opening polymerization processes.

BACKGROUND

Ring opening polymerization (ROP) processes enable compositional control of structure-property relationships in a macromolecular platform due to the wide variety of available monomers and the relatively indiscriminate ring-strain driving force for polymerization. This potential versatility in polymer design must be paired with a suitably versatile and facile polymerization technique that enables access to controlled molecular weights, compositions, and chain-end functionalities in the hands of the expert and non-expert alike. Epoxides, oxetanes, lactones and cyclic carbonates have all been explored as monomer substrates for ROP processes.

In spite of the versatility offered by epoxides as monomers, no general-use, consensus technique for epoxide polymerization for non-specialists has emerged in common usage in the same sense that it has for many other monomer classes such as vinyls, cyclic olefins, and lactones. While anionic ring-opening polymerization (AROP) has served as the de facto consensus polymerization technique for epoxides, only lower molecular weights are generally obtainable for any epoxide except for the simplest, ethylene oxide. The performance of AROP is sensitive to, and varies widely with monomer structure, and chain-transfer-to-monomer limits control of chain-end functionality and control of molecular weight.

The recently reported mono(μ-alkoxo)bis(alkylaluminum) (MOB) compound $[(Bn)_2NCH_2CH_2(\mu_2\text{-}O)Al(Et)_2\cdot Al(Et)_3]$ combines many of the advantages of the catalytic approaches (i.e., tolerance to monomer functionality) and exhibits a degree of control to epoxide polymerizations consistent with living controlled polymerization with neither auto-termination nor chain transfer with associated control of molecular weight via the reaction stoichiometry. However, this catalyst often required several days for complete consumption of the monomer precursor.

There remains a need for improved catalyst systems permitting rapid and controlled ring opening polymerization on a wide variety of cyclic substrates.

SUMMARY

Disclosed herein are improved catalytic systems for ring opening polymerizations. The systems can include Group 15 and Group 13 metal adducts. The systems can catalyze the ring opening polymerization of substrates including epoxides, oxetanes, lactones, and cyclic carbonates. The ring opening polymerizations can also be conducted in the presence of one or more additional electrophiles, including carbon dioxide. The ring opening polymerizations can also be conducted in the presence of an initiator, for instance a benzyl alcohol to give orthogonally protected polymers. The ring opening polymerizations can also be used to extend a pre-existing polymer to give block copolymers.

The details of one or more embodiments are set forth in the descriptions below. Other features, objects, and advantages will be apparent from the description and from the claims.

DETAILED DESCRIPTION

Figure 1:
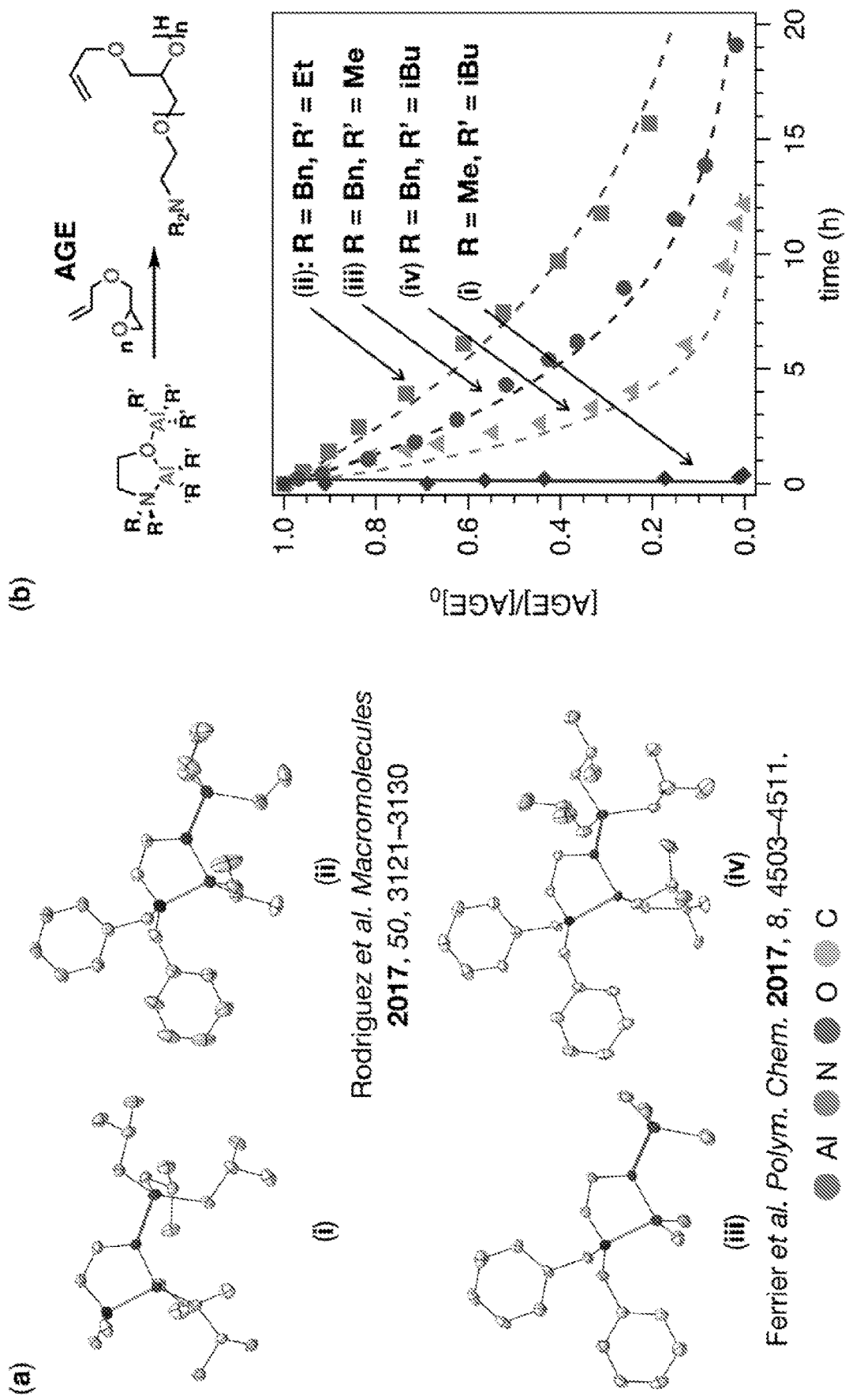
FIG. 1. (a) (i): $[(H_3C)_2NCH_2CH_2(\mu_2\text{-}O)Al(iBu)_2\cdot Al(iBu)_3]$. (ii) $[(Bn)_2NCH_2CH_2(\mu_2\text{-}O)Al(Et)_2\cdot Al(Et)_3]$. (iii): $[(Bn)_2NCH_2CH_2(\mu_2\text{-}O)Al(Me)_2\cdot Al(Me)_3]$. (iv): $[(Bn)_2NCH_2CH_2(\mu_2\text{-}O)Al(iBu)_2\cdot Al(iBu)_3]$. (b) The rate of epoxide polymerization initiated with MOB complexes has increased incrementally from (ii)-(iv) as alkyl substitution on aluminum was changed, (i) represents a disproportionate increase in polymerization rate with a change in alkyl substitution on nitrogen, (i) concludes a polymerization of allyl glycidyl ether (AGE) in minutes.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyL cirmolinyl, decahydroquinolinyl, 2H,6H~ 1,5,2-dithiazinyl, dihydrofuro[2,3b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

The catalyst systems disclosed herein can be used for ring-opening polymerization of cyclic compounds of Formula (I):

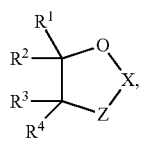

[Formula (I)]

wherein,

X is a chemical bond, C(O), or C(O)O;
when X is a chemical bond then Z is a chemical bond or the group —CR$^5$R$^6$—; and
when X is C(O) or C(O)O then Z is —CR$^5$R$^6$— or a group of the formula —(CH$_2$)$_z$—, wherein z is an integer from 0-6;
R$^1$ is selected from R$^{1a}$, OR$^{1a}$, N(R$^{1a}$)$_2$, SiR$^{1a}$$_3$, SR$^{1a}$, SO$_2$R$^{1a}$, SO$_2$N(R$^{1a}$)$_2$, C(O)R$^{1a}$; C(O)OR$^{1a}$, OCOR$^{1a}$; C(O)N(R$^{1a}$)$_2$, OC(O)N(R$^{1a}$)$_2$, N(R$^{1a}$)C(O)N(R$^{1a}$)$_2$, F, Cl, Br, I, cyano, and nitro, wherein R$^{1a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;

R$^2$ is selected from R$^{2a}$, OR$^{2a}$, N(R$^{2a}$)$_2$, SiR$^{2a}$$_3$, SR$^{2a}$, SO$_2$R$^{2a}$, SO$_2$N(R$^{2a}$)$_2$, C(O)R$^{2a}$; C(O)OR$^{2a}$, OCOR$^{2a}$; C(O)N(R$^{2a}$)$_2$, OC(O)N(R$^{2a}$)$_2$, N(R$^{2a}$)C(O)N(R$^{2a}$)$_2$, F, Cl, Br, I, cyano, and nitro, wherein R$^{2a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;
R$^3$ is selected from R$^{3a}$, OR$^{3a}$, N(R$^{3a}$)$_2$, SiR$^{3a}$$_3$, SR$^{3a}$, SO$_2$R$^{3a}$, SO$_2$N(R$^{3a}$)$_2$, C(O)R$^{3a}$; C(O)OR$^{3a}$, OCOR$^{3a}$; C(O)N(R$^{3a}$)$_2$, OC(O)N(R$^{3a}$)$_2$, N(R$^{3a}$)C(O)N(R$^{3a}$)$_2$, F, Cl, Br, I, cyano, and nitro, wherein R$^{3a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;
R$^4$ is selected from R$^{4a}$, OR$^{4a}$, N(R$^{4a}$)$_2$, SiR$^{4a}$$_3$, SR$^{4a}$, SO$_2$R$^{4a}$, SO$_2$N(R$^{4a}$)$_2$, C(O)R$^{4a}$; C(O)OR$^{4a}$, OCOR$^{4a}$; C(O)N(R$^{4a}$)$_2$, OC(O)N(R$^{4a}$)$_2$, N(R$^{4a}$)C(O)N(R$^{4a}$)$_2$, F, Cl, Br, I, cyano, and nitro, wherein R$^{4a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;
R$^5$, when present, is selected from R$^{4a}$, OR$^{4a}$, N(R$^{4a}$)$_2$, SiR$^{4a}$$_3$, SR$^{4a}$, SO$_2$R$^{4a}$, SO$_2$N(R$^{4a}$)$_2$, C(O)R$^{4a}$; C(O)OR$^{4a}$, OCOR$^{4a}$; C(O)N(R$^{4a}$)$_2$, OC(O)N(R$^{4a}$)$_2$, N(R$^{4a}$)C(O)N(R$^{4a}$)$_2$, F, Cl, Br, I, cyano, and nitro, wherein R$^{5a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;
R$^6$, when present, is selected from R$^{6a}$, OR$^{6a}$, N(R$^{6a}$)$_2$, SiR$^{6a}$$_3$, SR$^{6a}$, SO$_2$R$^{6a}$, SO$_2$N(R$^{6a}$)$_2$, C(O)R$^{6a}$; C(O)OR$^{6a}$, OCOR$^{6a}$; C(O)N(R$^{6a}$)$_2$, OC(O)N(R$^{6a}$)$_2$, N(R$^{6a}$)C(O)N(R$^{6a}$)$_2$, F, Cl, Br, I, cyano, and nitro, wherein R$^{6a}$ is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;
wherein any two or more of R$^1$, R$^2$, R$^3$, R$^4$, R$^5$, and R$^6$ may together form a ring.

In some embodiments, the compound of Formula (I) can include an epoxide of Formula (I-1), e.g., X and Z are both a chemical bond:

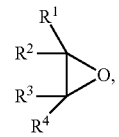

[Formula (I-1)]

wherein R$^1$, R$^2$, R$^3$, and R$^4$ have the meanings given above.

In other embodiments, the compound of Formula (I) can include an oxetane of Formula (I-2), e.g., X is a chemical bond and Z is the group CR$^5$R$^6$;

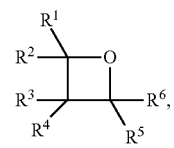

[Formula (I-2)]

wherein R$^1$, R$^2$, R$^3$, R$^4$, R$^5$, and R$^6$ have the meanings given above.

In further embodiments, the compound of Formula (I) can include a lactone of Formula (I-3), e.g., X is C(O):

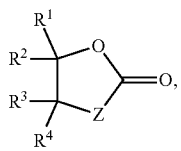

[Formula (I-3)]

wherein $R^1$, $R^2$, $R^3$, $R^4$, and Z have the meanings given above.

In other embodiments, the compound of Formula (I) can include a cyclic carbonate of Formula (I-4), e.g., X is C(O)O:

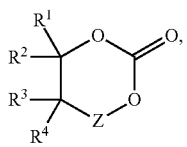

[Formula (I-4)]

wherein $R^1$, $R^2$, $R^3$, $R^4$, and Z have the meanings given above.

The ring opening polymerization can be conducted using a catalyst system comprising a catalyst of Formula II and propagator of Formula III:

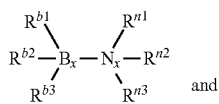

[Formula II]

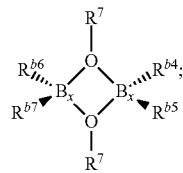

[Formula III]

wherein, $N_x$ is an atom selected from N, P, As, Sn, and Pb;

$B_x$ is in each case independently selected from an atom selected from B, Al, Ga, In, and Th;

$R^{b1}$, $R^{b2}$, $R^{b3}$, $R^{b4}$, $R^{b5}$, $R^{b6}$, and $R^{b7}$ are independently selected from are independently selected from $C_{1-8}$alkyl; wherein any two or more of $R^{b1}$, $R^{b2}$, and $R^{b3}$; $R^{b4}$ and $R^{b5}$; or $R^{b6}$ and $R^{b7}$ may together form a ring;

$R^{n1}$, $R^{n2}$, and $R^{n3}$ are independently selected from hydrogen and $C_{1-8}$alkyl, wherein any two or more of $R^{n1}$, $R^{n2}$, and $R^{n3}$ may together form a ring;

$R^7$ is $C_{1-8}$alkyl, aryl, or $C_{1-3}$alkaryl, or wherein $R^7$ may form a $C_{2-8}$ alkyl or $C_{2-8}$ alkoxy group with one or more of $R^{n1}$, $R^{n2}$, and $R^{n3}$.

In some instance, the catalyst and propagator are separate compounds. The catalyst and propagator may be provided as a crystalline adduct, thereby ensuring good control over their relative stoichiometry. In other embodiments, the catalyst and propagator are covalently bonded to one another, i.e., as a single compound bearing both catalyst and propagator domains.

In certain embodiments $B_x$ is Al and $N_x$ is N. Preferred $R^{b1}$, $R^{b2}$, $R^{b3}$, $R^{b4}$, $R^{b5}$, $R^{b6}$, and $R^{b7}$ groups include methyl, ethyl, n-propyl, isopropyl, n-butyl, sec-butyl, isobutyl, and tert-butyl. Isobutyl and isopropyl are especially preferred.

In certain embodiments, $R^{n1}$, $R^{n2}$, and $R^{n3}$ are each hydrogen, methyl, ethyl, n-propyl, isopropyl, n-butyl, sec-butyl, isobutyl, or tert-butyl, preferably methyl. In other cases, $R^{n1}$ and $R^{n2}$, or $R^{n1}$, $R^{n2}$, and $R^{n3}$ can together form a ring. Exemplary such compounds of Formula (II) include:

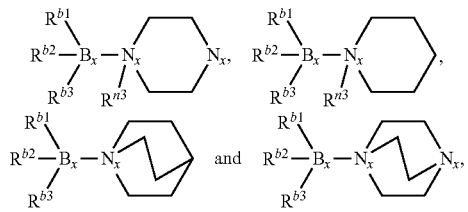

wherein $R^{b1}$, $R^{b2}$, $R^{b3}$, and $R^{n3}$ have the meaning given above. In certain embodiments for which the catalyst includes more than one $N_x$ atom, each of the $N_x$ can be bonded to a $B_x$ group. Exemplary catalysts include:

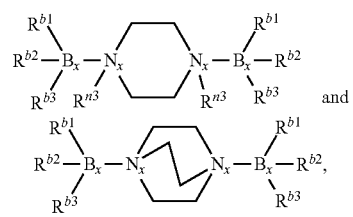

wherein $R^{b1}$, $R^{b2}$, $R^{b3}$, and $R^{n3}$ have the meaning given above. The catalyst can have varying stoichiometric ratios between the $B_x$ and $N_x$ components. For instance, the $B_x$:$N_x$ ratio can be 1:1, 2:1, 1:2, 3:1, 1:3 and the like.

When the catalyst and propagator are separate compounds, they may be present in the catalyst system in various ratios. For instance, the ratio of the compound of Formula (II) to the compound of Formula (III) can be from 10:1 to 1:20, from 10:1 to 1:10, from 5:1 to 1:5, from 2:1 to 1:2, from 10:1 to 1:1, from 10:1 to 2:1, from 10:1 to 5:1, from 5:1 to 1:1, from 5:1 to 2:1, from 1:1 to 1:10, from 1:2 to 1:10, from 1:5 to 1:10, from 1:1 to 1:5, or from 1:1 to 1:2.

In some embodiments, the catalyst of Formula (II) and propagator of Formula (III) may be covalently bonded together, for example $R^7$ and $R^{n1}$ together form an $C_2$ alkyl having the formula:

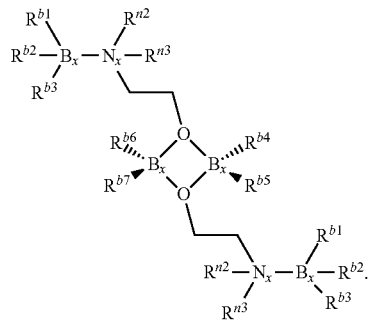

when $R^7$ and $R^{n1}$ together form a $C_{2-8}$ alkyl or $C_{2-8}$ alkoxy group with one or more of $R^{n1}$, it is preferred that $R^{n2}$ and $R^{n3}$ are each hydrogen, methyl, ethyl, n-propyl, isopropyl, n-butyl, sec-butyl, isobutyl, or tert-butyl, preferably methyl. In other cases $R^{n2}$ and $R^{n3}$ together form a ring.

In certain embodiments, the polymerization can be conducted by combining a compound of Formula [IIa]:

wherein $N_x$, $R^{n1}$, $R^{n2}$, and $R^{n3}$ are as defined above, with a compound of Formula [IIIa]:

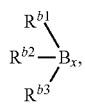

wherein $B_x$, $R^{b1}$, $R^{b2}$, and $R^{b3}$ are as defined above, in the presence of a compound of Formula I. In certain embodiments, the compound of Formula [IIIa] can be present in roughly equal or slightly great amounts relative to the compound of Formula [IIa]. For instance, the ratio of the [IIIa]:[IIa] can be from 1:1 to 2:1, from 1:1 to 1.9:1, from 1:1 to 1.8:1, from 1:1 to 1.7:1, from 1:1 to 1.6:1, from 1:1 to 1.5:1, from 1:1 to 1.4:1, from 1:1 to 1.3:1, from 1:1 to 1.2:1, from 1:1 to 1.1:1, or from 1:1 to 1.05:1. In certain embodiments, the ratio of [IIIa]:[IIa] can be from 1.05:1 to 1.5:1, from 1.05:1 to 1.4:1, from 1.05:1 to 1.3:1, from 1.05:1 to 1.2:1, or from 1.05:1 to 1.05.1:1. In other embodiments the ratio of [IIIa]:[IIa] can be from 1.25:1 to 1.75:1. In certain embodiments, the ratio of [IIIa]:[IIa] is about 1:1, optionally in the presence of a separate propagator.

Suitable compounds of Formula [IIa] include trialkyl amines like triethylamine, tri-n-propylamine, and tri-n-butylamine, cyclic amines like diazabicyclo[2,2,2]octane (DABCO), piperidine, quinuclidine, and heterocyclic amines like pyridine, dimethylaminopyridine (DMAP), imidazole, and pyrrole. Suitable compounds of Formula [IIIa] include trialkyl aluminum compounds like trimethylaluminum, triethylaluminum, triisopropylaluminum, and tri-isobutylaluminum.

The ring opening polymerization may be conducted in the presence of an external initiator, for instance an alcohol such as benzyl alcohol (including substituted benzyl alcohols like paramethoxybenzyl alcohol). The resulting polymer is orthogonally functionalized (free hydroxyl and benzyl ether), permitting a variety of different further synthetic manipulations.

In instances in which the compound of Formula (I) is an epoxide or oxetane, the ring-opening polymerization may further be conducted in the presence of carbon dioxide, leading to polycarbonate ring opened products.

The product of the ring opening polymerization can have the Formula (IV):

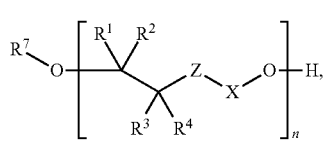

wherein $R^1$, $R^2$, $R^3$, $R^4$, Z, and X have the meanings given above. In some instances, n can be an integer greater than 10, greater than 25, greater than 50, greater than 100, greater than 250, greater than 500, greater than 750, greater than 1,000, greater than 1,500, greater than 2,000, or greater than 2,500. In certain embodiments, n can be an integer from 10-1,000, 50-1,000, 100-1,000, 250-1,000, 500-1,000, 750-1,000, 10-5,000, 50-5,000, 100-5,000, 250-5,000, 500-5,000, 750-5,000, 1,000-5,000, 1,500-5,000, 2,000-5,000, or 2,500-5,000. In some embodiments, n can be from 10-100,000, from 100-100,000, from 500-100,000, from 1,000-100,000, from 10,000-100,000, from 25,000-100,000, from 50,000-100,000, or from 75,000-100,000. In other embodiments, n can be from 5,000-25,000 or from 5,000-10,000.

The ring opened polymers can have a molecular weight that is greater than 2,500 g/mol, greater than 5,000 g/mol, greater than 10,000 g/mol, greater than 15,000 g/mol, greater than 25,000 g/mol, greater than 50,000 g/mol, greater than 100,000 g/mol, greater than 250,000 g/mol, greater than 500,000 g/mol, or greater than 1,000,000 g/mol. The ring opened polymers of Formula (IV) can be characterized by their polydispersity (PDI).

In some instances, the PDI can be from 1-1.5, from 1-1.4, from 1-1.3, from 1-1.25, from 1-1.2, from 1-1.15, from 1-1.1, or from 1-1.05.

In other embodiments, the ring opening polymerization can be used to extend an existing polymer, either polymer of Formula (IV), or a polymer obtained from a different source. The polymer can be reacted with a compound of Formula (I) (having a different set of substituents than found in the polymer of Formula (IV), as defined above in the presence of a suitable catalyst and propagator as defined above. In this fashion, block co-polymers, including tri-block copolymers, can be prepared.

Examples

The following examples are for the purpose of illustration of the invention only and are not intended to limit the scope of the present invention in any manner whatsoever.

Materials and Methods

Materials. 2-dimethylaminoethanol (Sigma-Aldrich, ≥99.5%), 2, [2-(dimethylamino)ethoxy]ethanol (Sigma-Aldrich, 98%), hexanes (Sigma-Aldrich, ACS reagent, >99.5%), triisobutylaluminum (1.0 M in hexanes, Sigma-Aldrich), trimethylaluminum (2.0 M in hexanes, Sigma-Aldrich), triethylamine (Acros Organics, 99%), $D_6$-benzene (Cambridge Analytica), and $CDCl_3$ (Cambridge Analytica) were used as received. Allyl glycidyl ether (Aldrich, >99%) and propylene oxide (TCI, >99%) were dried over calcium hydride. All air and moisture sensitive reactions were prepared under a dry nitrogen atmosphere inside a glovebox.

Equipment. $^1H$ NMR and $^{13}C$ NMR spectroscopy were performed on a 400 MHz Agilent NMR spectrometer at room temperature and referenced to the residual solvent signal of $CDCl_3$ and $d_6$-benzene (7.26 ppm and 7.16 ppm, respectively). Size exclusion chromatography (SEC) was carried out on an Agilent system with a 1260 Infinity isocratic pump, degasser, and thermostated column chamber held at 30° C. containing Agilent PLgel 10 μm MIXED-B and 5 μm MIXED-C columns with a combined operating range of 200-10,000,000 g/mol relative to polystyrene standards. THF was used as the mobile phase. A suite of detectors from Wyatt Technologies provided measurement of polymer concentration, molecular weight and viscosity.

Static light scattering was measured using a DAWN HELEOS II Peltier system, with differential refractive index measured with an Optilab TrEX, and differential viscosity measured using a Viscostar II. In-situ Fourier Transform Infrared (FTIR) spectroscopy of polymerizations was performed on a Mettler Toledo ReactIR 15 with an optical range of 4000-650 cm$^{-1}$. XRD data was collected on a Rigaku AFC 12 diffractometer with a Saturn 724+ CCD using a graphite monochromator with MoKα radiation (λ=0.71073 Å). A total of 1136 frames of data were collected using ω-scans with a scan range of 0.5° and a counting time of 45 seconds per frame. The data were collected at 173 K using a Rigaku XStream low temperature device. Electrospray ionization mass spectrometry was performed on an Agilent Technologies 6530 Accurate-Mass Q-TOF LC/MS. The eluent was 100% H$_2$O+100 mM NH$_4$QAc with a flow rate of 0.2 mL/min.

A reaction vial was charged with a stir bar and 1.0 M triisobutylaluminum in hexane (12.7 mL, 12.7 mmol) and cooled to −78° C. in a dry nitrogen glovebox. A ligand (dimethylaminoethanol (i) or 2,[2-(dimethylamino)ethoxy] ethanol (v)) (4.7 mmol) was added dropwise to the vial containing triisobutylaluminum. The solution was set to stir and warm to room temperature overnight. The solution was then directly cooled to −40° C. to crystallize the desired product. The resultant crystals were washed three times with anhydrous hexanes and dried in vacuo.

Synthesis of (vi). A reaction vial was charged with a stir bar, 6.35 mL anhydrous hexanes, and 2.0 M trimethylaluminum in hexane (6.35 mL, 12.7 mmol) and cooled to −78° C. in a dry nitrogen glovebox. A ligand, 2-methoxyethanol (12.7 mmol), was added dropwise to the vial containing trimethylaluminum. The solution was set to stir and warm to room temperature overnight. The solution was then directly cooled to −40° C. to crystallize the desired product. The resultant crystals were washed three times with anhydrous hexanes and dried in vacuo.

Synthesis of (vii). A reaction vial was charged with a stir bar, 6.35 mL anhydrous hexanes, and 2.0 M trimethylaluminum in hexane (6.35 mL, 12.7 mmol) and cooled to −78° C. in a dry nitrogen glovebox. Then, triethylamine (12.7 mmol) was added dropwise to the vial containing trimethylaluminum. The solution was set to stir and warm to room temperature overnight. The solution was then directly cooled to −40° C. to crystallize the desired product. The resultant crystals were washed three times with anhydrous hexanes and dried in vacuo.

In-situ FTIR spectroscopy. A 100 mL, two arm reaction flask was charged with (i) and a stir bar under nitrogen. The flask was sealed with a septum on the side arm and the FTIR probe in the center arm. The probe temperature was calibrated and a background spectra was collected. Allyl glycidyl ether (AGE) monomer (12 mL) was injected into the side arm while stirring. The final concentration of (i) in monomer was ca. 0.09 M. The aluminum bead bath was then brought up to the final reaction temperature of 60° C. A spectrum was collected every 15 seconds for the first 45 minutes and every 5 minutes thereafter.

In-situ NMR spectroscopy general procedure. A scintillation vial was charged with (i) (0.0054 g-0.0024 g). 0.1 mL allyl glycidyl ether was added to the initiator, followed by 0.7 mL deuterated benzene for final (i) concentrations of: 5.84, 7.59, 12.27, and 15.78 mM. The mixture was pipetted into an NMR tube and spectrum were collected on a 500 MHz Varian iNOVA spectrometer at room temperature. A proton spectra was collected every ten minutes for the first hour followed by one spectra per hour for the next eleven hours.

NMR spectroscopy at fixed polymerization time points. A reaction vial was charged with a stir bar, initiator/catalyst (structures (i), (v), (vi), and (vii)), and AGE. The final initiating site concentration was held constant across all experiments at ca. 0.09 M except in the case of the pure catalyst (vii) sample where there are no initiating sites, in which case the concentration of the catalyst used was ca. 0.09 M. Additional equivalents (one, two, and four) of catalyst (i.e., structure (vii)) compared to initiating site were added to (vi) prior to adding AGE for two experiments (c.f, FIG. 9). Each experiment was conducted in duplicate. The vials were then placed on a stir plate at 60° C. Small aliquots (ca. 30 μL) were taken at specified time points. These samples were dissolved in d-chloroform and conversion was determined using $^1$H NMR spectroscopy.

NMR spectroscopy of (i) incubated with THF. A vial was charged with (i) (0.013 g, 0.026 g, 0.053 g, and 0.107 g) with 0.7 mL D$_6$-benzene and 0.005 mL THF. $^1$H NMR spectra were collected for each sample and are displayed in FIG. 6. Detailed assignments for the $^1$H NMR spectra are listed below. For clarity, the peak assignment will be followed by "**" or "THF" if it belongs to (i), dimerized (i), or THF, respectively.

0.25 equivalents of THF: $^1$H NMR (d$_6$-benzene, 400 MHz) δ-0.03 ppm dd (AlCH$_2$CH(CH$_3$)$_2$)*, 0.21 ppm dd (AlCH$_2$CH(CH$_3$)$_2$)*, 0.28 ppm d (AlCH$_2$CH(CH$_3$)$_3$)*, 1.03 ppm t THF, 1.06 ppm d (AlCH$_2$CH(CH$_3$)$_2$)*, 1.11 ppm d (AlCH$_2$CH(CH$_3$)$_2$)*, 1.22 ppm d (AlCH$_2$CH(CH$_3$)$_3$)**, 1.32 ppm d (AlCH$_2$CH(CH$_3$)$_3$)*, 1.53 ppm s (N(CH$_3$)$_2$)*, 1.71 ppm t (NCH$_2$CH$_2$O)*, 1.94 ppm m (AlCH$_2$CH(CH$_3$)$_2$)*, 2.09 ppm m (AlCH$_2$CH(CH$_3$)$_3$)**, 2.23 ppm m (AlCH$_2$CH(CH$_3$)$_3$)*, 3.37 ppm t THF, 3.50 ppm t (NCH$_2$CH$_2$O)*.

0.50 equivalents of THF: $^1$H NMR (d$_6$-benzene, 400 MHz) δ-0.02 ppm dd (AlCH$_2$CH(CH$_3$)$_2$)*, 0.05 ppm d (AlCH$_2$CH(CH$_3$)$_2$), 0.19 ppm d (AlCH$_2$CH(CH$_3$)$_3$), 0.21 ppm dd (AlCH$_2$CH(CH$_3$)$_2$)*, 0.31 ppm d (AlCH$_2$CH(CH$_3$)$_3$)*, 1.01 ppm t THF, 1.07 ppm d (AlCH$_2$CH(CH$_3$)$_2$)*, 1.12 ppm d (AlCH$_2$CH(CH$_3$)$_2$)*, 1.24 ppm d (AlCH$_2$CH(CH$_3$)$_3$ and AlCH$_2$CH(CH$_3$)$_2$)**, 1.35 ppm d (AlCH$_2$CH(CH$_3$)$_3$)*, 1.49 ppm s (N(CH$_3$)$_2$)*, 1.67 ppm t (NCH$_2$CH$_2$O)*, 1.90 ppm s (N(CH$_3$)$_2$)**, 1.95 ppm m (AlCH$_2$CH(CH$_3$)$_2$)*, 2.12 ppm m (AlCH$_2$CH(CH$_3$)$_3$)**, 2.26 ppm m (AlCH$_2$CH(CH$_3$)$_3$)*, 3.37 ppm t THF, 3.45 ppm t (NCH$_2$CH$_2$O)*, 3.55 ppm t (NCH$_2$CH$_2$O)**.

1.00 equivalents of THF: $^1$H NMR (d$_6$-benzene, 400 MHz) δ-0.06 ppm dd (AlCH$_2$CH(CH$_3$)$_2$)*, 0.01 ppm d (AlCH$_2$CH(CH$_3$)$_2$), 0.17 ppm d (AlCH$_2$CH(CH$_3$)$_3$), 0.18 dd (AlCH$_2$CH(CH$_3$)$_2$)*, 0.29 ppm d (AlCH$_2$CH(CH$_3$)$_3$)*, 1.02 ppm t THF, 1.03 ppm d (AlCH$_2$CH(CH$_3$)$_2$)*, 1.08 ppm d (AlCH$_2$CH(CH$_3$)$_2$)*, 1.22 ppm d (AlCH$_2$CH(CH$_3$)$_3$ and AlCH$_2$CH(CH$_3$)$_2$)**, 1.32 ppm d (AlCH$_2$CH(CH$_3$)$_3$)*, 1.42 ppm s (N(CH$_3$)$_2$)*, 1.60 ppm t (NCH$_2$CH$_2$O)*, 1.86 ppm s (N(CH$_3$)$_2$), 1.95 ppm m (AlCH$_2$CH(CH$_3$)$_2$), 2.08 ppm m (AlCH$_2$CH(CH$_3$)$_3$)**, 2.23 ppm m (AlCH$_2$CH(CH$_3$)$_3$)*, 3.35 ppm t THF, 3.43 ppm t (NCH$_2$CH$_2$O)*, 3.50 ppm t (NCH$_2$CH$_2$O)**.

2.00 equivalents of THF: $^1$H NMR (d$_6$-benzene, 400 MHz) δ-0.01 ppm dd (AlCH$_2$CH(CH$_3$)$_2$)*, 0.06 ppm d (AlCH$_2$CH(CH$_3$)$_2$), 0.21 ppm d (AlCH$_2$CH(CH$_3$)$_3$), 0.22 ppm dd (AlCH$_2$CH(CH$_3$)$_2$)*, 0.33 ppm d (AlCH$_2$CH(CH$_3$)$_3$)*, 1.08 ppm d (AlCH$_2$CH(CH$_3$)$_2$)*, 1.13 ppm t THF, 1.14 ppm d (AlCH$_2$CH(CH$_3$)$_2$)*, 1.27 ppm d (AlCH$_2$CH(CH$_3$)$_3$) and (AlCH$_2$CH(CH$_3$)$_2$)**, 1.37 ppm d (AlCH$_2$CH (CH$_3$)$_3$)*, 1.45 ppm s (N(CH$_3$)$_2$)*, 1.63 t (NCH$_2$CH$_2$O)*, 1.90 ppm s (N(CH$_3$)$_2$), 1.99 ppm m (AlCH$_2$CH (CH$_3$)$_2$), 2.13 ppm m (AlCH$_2$CH(CH$_3$)$_3$)**, 2.28 ppm m (AlCH$_2$CH(CH$_3$)$_3$)*, 3.43 ppm t THF, 3.47 ppm t (NCH$_2$CH$_2$O)*, 3.55 ppm t (NCH$_2$CH$_2$O)**.

Electrospray ionization mass spectrometry (ESI-MS). ESI-MS was utilized to determine the end group of a polymer synthesized using (i) and using a combination of (vi) and (vii). Polypropylene oxide) (PPO) was utilized for these studies for ease of analysis. Under inert atmosphere, a scintillation vial was charged with a stir bar and either 0.171 g (i) or 0.0528 g (vi) and 0.0712 g (vii). Finally, 2 g of propylene oxide monomer was injected into the scintillation vial. The reaction then proceeded at room temperature. ESI-MS was then performed on the resultant PPO.

A new MOB initiator was synthesized from dimethyl-amino-ethanol and triisobutylaluminum resulting in (i), which was crystallized directly from the reaction medium and characterized by X-ray crystallography (structure shown in FIG. 1a) and NMR spectroscopy. Previously published MOB structures as synthesized from dibenzyl-amino-ethanol and triethyl (ii), trimethyl (iii) and triisobutyl aluminum (iv) are also shown in FIG. 1a. As with other MOB structures, the new [(Me)$_2$NCH$_2$CH$_2$($\mu_2$-O)Al(iBu)$_2$·Al(iBu)$_3$] (i) exhibited strong structure-kinetic relationships for epoxide polymerization.

Neat polymerizations were conducted to compare the rates among new (i) and previously reported homologous MOB initiators (ii)-(iv). The monomer-to-initiator ratio was selected to create a 10,000 g/mol poly(allyl glycidyl ether) (PAGE) at 100% conversion of allyl glycidyl ether (AGE): [AGE]$_0$/[MOD]$_0$=87. The polymerization using (i) was complete after ca. 20 minutes and produced a large exotherm presumably from the rapid release of epoxide ring strain energy (ca. 25 kcal/mol),[37] raising the unbuffered reaction temperature of the polymerization to ca. 80° C. as measured by the in-situ ReactIR 15 FTIR probe. The conversion of AGE, as determined by $^1$H NMR spectroscopy of the crude reaction mixture, was quantitative and the number-average molecular weight (M$_n$), determined by size exclusion chromatography (SEC) with refractive index, viscometer, and light scattering detection, was 9400 g/mol with a molecular weight dispersity (Đ) of 1.15. To quantitatively compare rates of polymerization, we report apparent rate constants (k$_{app}$ [=] s$^{-1}$) by fitting the time-dependent consumption of monomer to [AGE]/[AGE]$_0$=e$^{-k_{app} \times t}$ or $-\ln$[AGE]/[AGE]$_0$=k$_{app}\times$t. The apparent rate constants (k$_{app}$ [=] s$^{-1}$) are compared for neat polymerizations of AGE with a targeted degree of polymerization of 87 (10 000 g/mol). FIG. 1b shows a plot of the normalized monomer concentration as a function of time as measured by in-situ FTIR for an AGE polymerization utilizing (i). The apparent propagation rate constant for (i) (k$_{app}^{(i)}$) was 4.8×10$^{-3}$ s$^{-1}$ ([(i)]$_0$=97 mmol/L). Plots of monomer consumption over time for polymerizations utilizing compounds (ii), (iii), and (iv) are also present on the plot for comparison. Significantly, (i) represented a ca. 170-fold increase in polymerization rate over the first-reported MOB initiator, [(Bn)$_2$NCH$_2$CH$_2$($\mu_2$-O)Al (Et)$_2$·Al(Et)$_3$] (ii). The increase in rate due to amine substitution alone represented an increase in k$_{app}$ of 50-fold from the Bn$_2$N-functional MOB (iv) to the Me$_2$N-functional-MOB (i). The conclusion from this rate increase is that the alkylamine affects the site of monomer coordination and enchainment at every propagation event, and not just the first monomer addition associated with initiation as was proposed in previous work.

Figure 2:
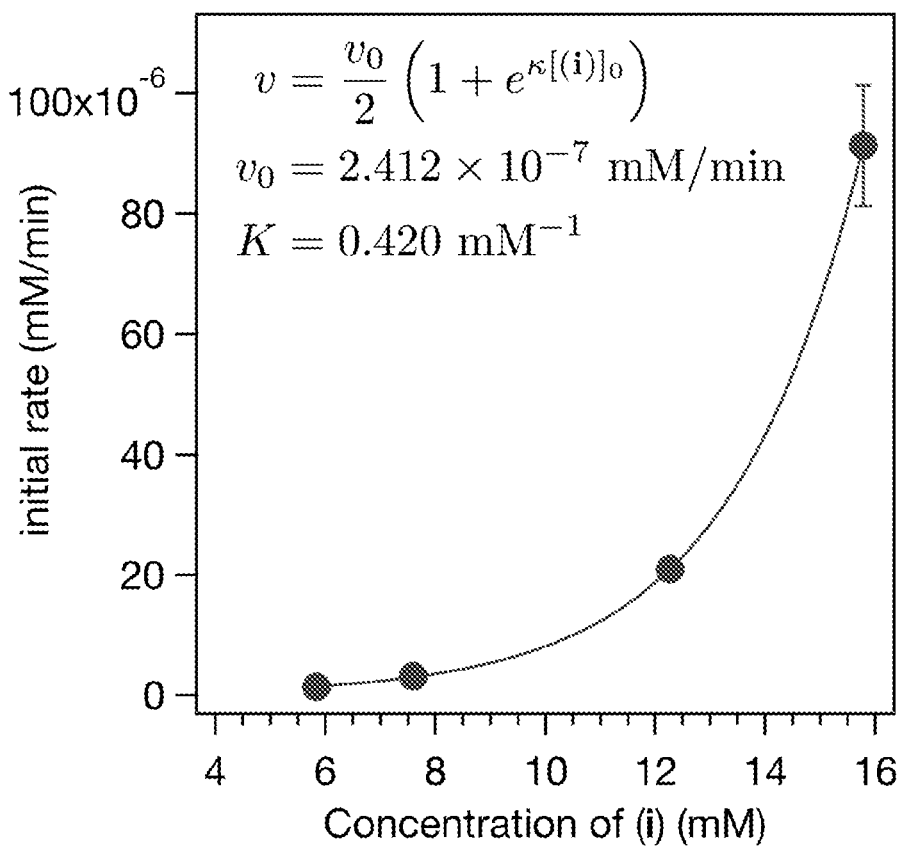
FIG. 2. The initial polymerization rate was measured under isothermal conditions by $^1H$ NMR spectroscopy in $d_6$-benzene at room temperature with no more than 3% conversion of AGE monomer. An apparent exponential dependence of polymerization rate on [(i)] was observed: $-d[AGE]/dt=v(t)=v_0(1+e^{K\times[(i)]})/2$ with $v_0=1.206\pm0.003\times10^{-7}$ mM/min as the polymerization rate in the absence of any catalytic activity, and $K=0.420\pm0.002$ $mM^{-1}$ as the per-unit-concentration enhancement in rate due to catalytic activity.

Solution polymerizations using (i) were disproportionately slower compared with the rapid neat polymerizations. While a neat polymerization concluded after 16 minutes (k$_{app}$=4.8×10$^{-3}$ s$^{-1}$, [(i)]$_0$=97 mM), solution polymerizations required two days for completion (k$_{app}$=1.6×10$^{-5}$ s$^{-1}$, [(i)]$_0$=46 mM). In light of this apparent discrepancy, we attempted to determine the dependence of the polymerization rate on MOB (i) concentration. We monitored a series of AGE polymerizations at several MOB concentrations using NMR spectroscopy in d$_6$-benzene under isothermal conditions. The polymerization rates were calculated using the linear portion of the initial monomer consumption, which for these polymerizations utilized over 12 hours of spectroscopic data resulting in a change in monomer conversion of up to ca. 3%. The results are shown in FIG. 2. Notably, the rate of polymerization increased exponentially with concentration of (i). The heat released due to epoxide ring opening was first considered as a potential source for the unusual high dependence of rate on concentration of (i). However, under our reaction conditions only negligible heating of the polymerization reaction would occur (<0.1° C.). We interpreted the experimentally measured rate (v [=] mM/min) as a function of [(i)] by fitting the rate (v) to v=v$_0$(1+e$^{\kappa[(i)]}$)/2 where K describes the rate increase per-unit-concentration of [(i)] added to the system (κ [=] mM$^{-1}$), and v$_0$ is the rate of an uncatalyzed reaction (v$_0$ [=] mM/min). This empirical description is consistent with (i) possessing the characteristics of both initiator and catalyst, which would serve as a speculative explanation for the apparent autocatalytic polymerization. Next, we explored the structural basis for the autocatalytic behavior of (i) giving rise to the unusual behavior in FIG. 2.

Figure 3:
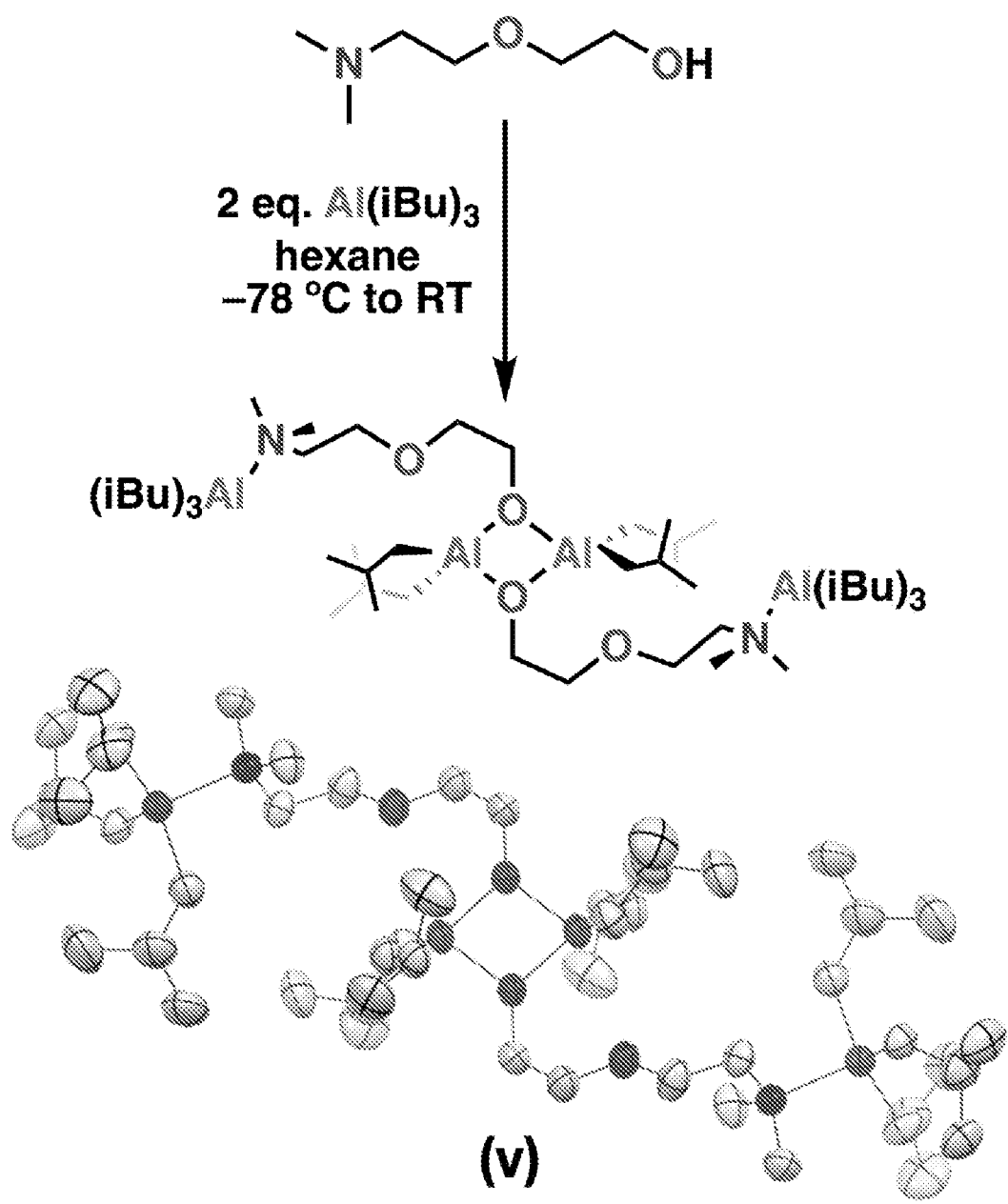
FIG. 3. The proposed intermediate (v) was synthesized from $Me_2NCH_2CH_2OCH_2CH_2OH$ and triisobutylaluminum according to the standard MOB synthetic procedure. The proposed intermediate is a dimer of MOBs with a dative N—Al bond between alkylamine and trialkylaluminum.

To gain mechanistic insight, we attempted the synthesis of an analog to the polymerization intermediate by the reaction between of 2-(2-(dimethylamino)ethoxy)ethanol and triisobutylaluminum. We posit that this combination of reagents provided a model for the nascent propagating species after a single monomer enchainment of epoxide to the MOB, with the caveat that our model intermediate was formed via a different route than the true polymerization intermediate. The structure of the resultant complex (v) obtained by X-ray crystallography is shown in FIG. 3. The symmetric structure of the resultant compound was unanticipated. In particular, (v) presented a bis(μ-alkoxo-dialkylaluminum) (BOD) structure.

Figure 4:
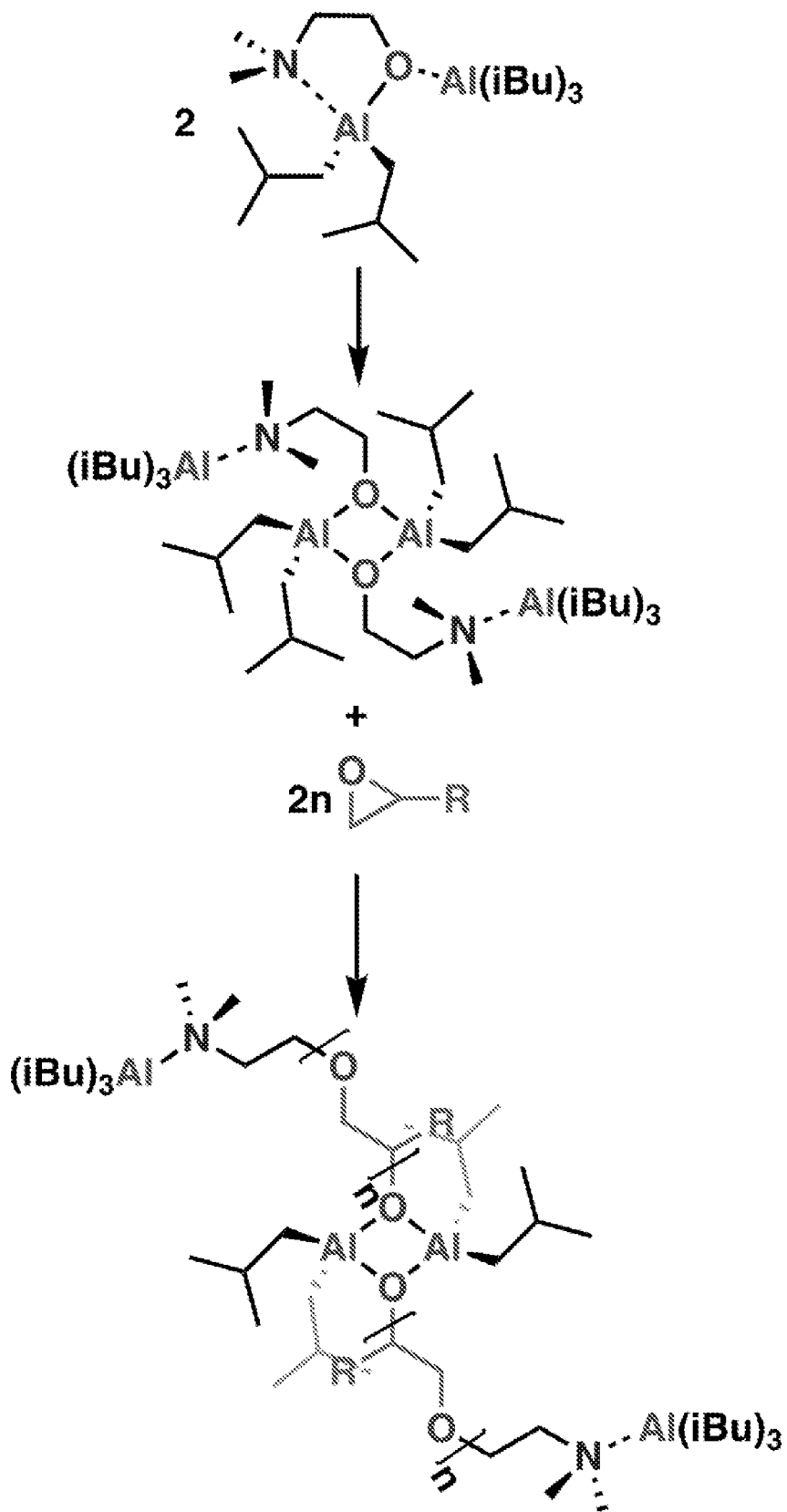
FIG. 4 Proposed MOB to bis(μ-alkoxo-dialkylaluminum) (BOD) transition to active polymerization intermediate.
Figure 5:
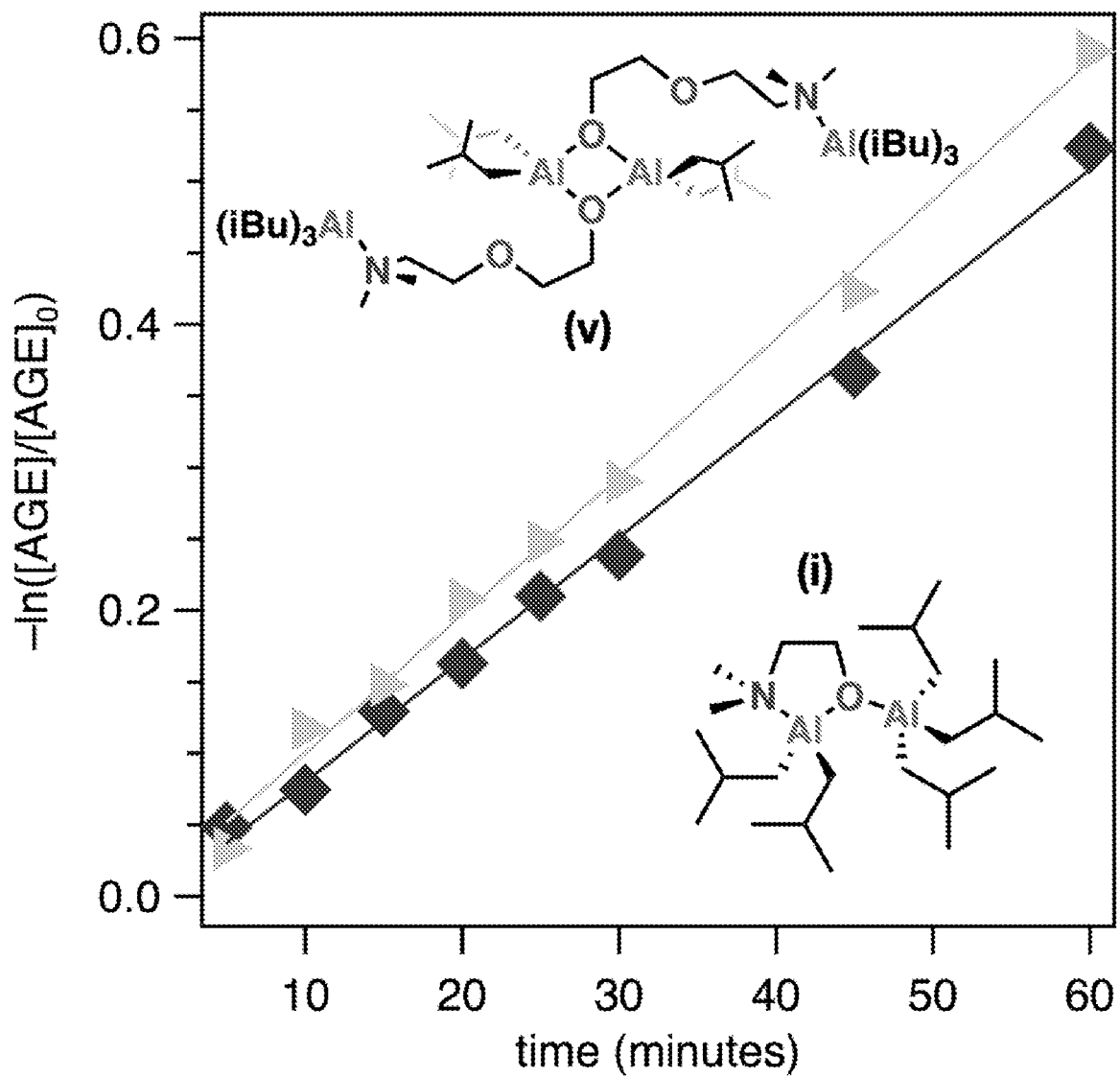
FIG. 5. Comparison of polymerization rate using compounds (i) and (v). Apparent rate constants were determined by fitting $-\ln[AGE]/[AGE]_0=k_{app}\times t$: $k_{app}^{(i)}=1.40\pm0.02\times10^{-4}\ s^{-1}$, $k_{app}^{(v)}=1.60\pm0.02\times10^{-4}\ s^{-1}$ neat at 60° C.

To substantiate if the purported intermediate (v) was representative of the polymerization intermediate, we first compared the rates of AGE polymerization using (i) and (v). Similar polymerization rates produced by (i) and (v) would support that the BOD structure (v) may indeed be representative of the polymerization intermediate formed by MOBs (i)-(iv). All neat polymerizations were performed in duplicate at 60° C. Aliquots of the active polymerizations were taken at time points of 5, 10, 15, 20, 25, 30, 45, and 60 minutes and conversion was determined by $^1$H NMR spectroscopy of the remaining unreacted monomer in the crude reaction mixture. Under these conditions, (i) and (v) produced a first-order consumption of AGE monomer with k$_{app}^{(i)}$ of 1.40±0.02×10$^{-4}$ s$^{-1}$ for (i) and k$_{app}^{(v)}$=1.62±0.02× 10$^{-4}$ s$^{-1}$ for (v) as shown in FIG. 5. The kinetic similarity between (i) and (v) under identical reaction conditions suggested that MOBs (i)-(iv) may dimerize into BOD structures as the active polymerization intermediate (FIG. 4).

Figure 6:
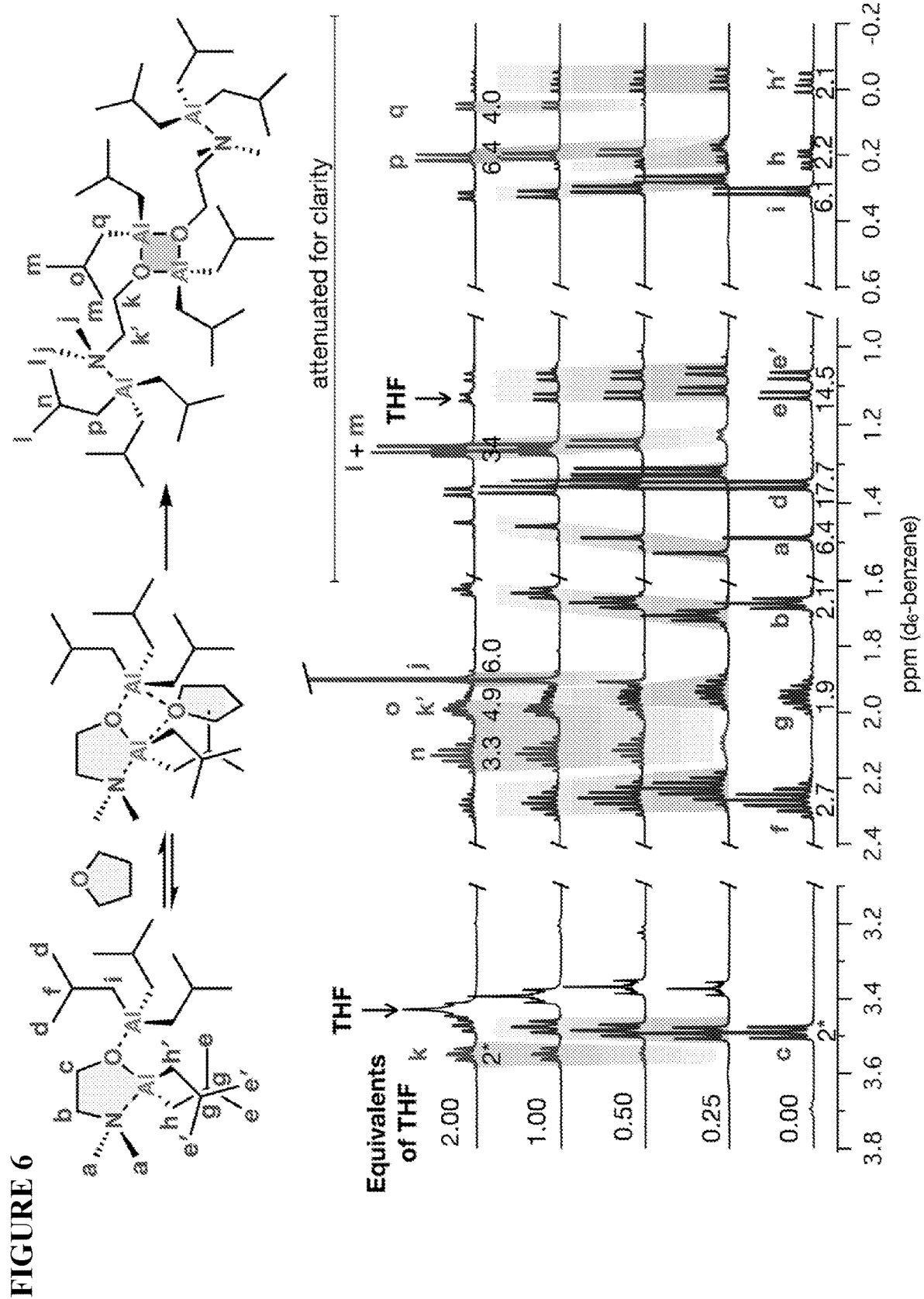
FIG. 6. $^1H$ NMR spectra of (i) in $d_6$-benzene with increasing equivalents of THF added. From bottom to top: 0.00, 0.25, 0.5, 10, and 2.0 equivalents of THF. As the concentration of THF was increased, the peaks associated with the monomer species (i), highlighted in blue, decrease and new peaks, highlighted in red, grow which we attribute to the dimerized species. Integrals are indicated in black below peaks. Asterisks indicate reference integrals.

To obtain more direct evidence of a MOB to BOD transition, we utilized THF as a proxy monomer to observe MOB dimerization under similar conditions encountered in polymerization, but in the absence of chain-growth. THF was titrated in increasing amounts to (i) in $d_6$-benzene and $^1$H NMR spectra were collected on the reaction mixtures. The $^1$H NMR spectra are shown in FIG. 6. As the THF concentration was increased, new peaks appeared and grew proportionally to the decrease in peaks associated with (i). The positions of the new signals were similar to those observed from the proposed intermediate (v) in $d_6$-benzene. The reduced number of signals was consistent with the more symmetric, dimeric structure. The signals associated with the diatopic protons due to the bend in the N—C—C—O—AlR$_3$ plane of (i) converge into degenerate signals as THF was added, which was further consistent with symmetrization. $^1$H-$^1$H Correlated NMR Spectroscopy (COSY) was also performed on the sample with two equivalents of THF. Interpretation of the COSY spectrum suggested that there were two species present in solution; one set of peaks was attributed to the dimerized structure and a separate set of signals was associated with the MOB. Likewise, in epoxide polymerization we propose that exposure of the MOB to epoxide monomer removes the datively-bound AlR$_3$ and provokes MOB dimerization while the liberated alkylamine captures the mobile AlR$_3$ species. Combined, the NMR spectroscopy data provides further evidence that monomer induces the MOB→BOD dimerization, where the BOD serves as the active polymerization intermediate in MOB initiated epoxide polymerization. While these results provide evidence for the structure of the active polymerization species, they do not yet explain the steep increase in rate we see with changes in amine substitution, and with increases in concentration of (i).

Figure 7:
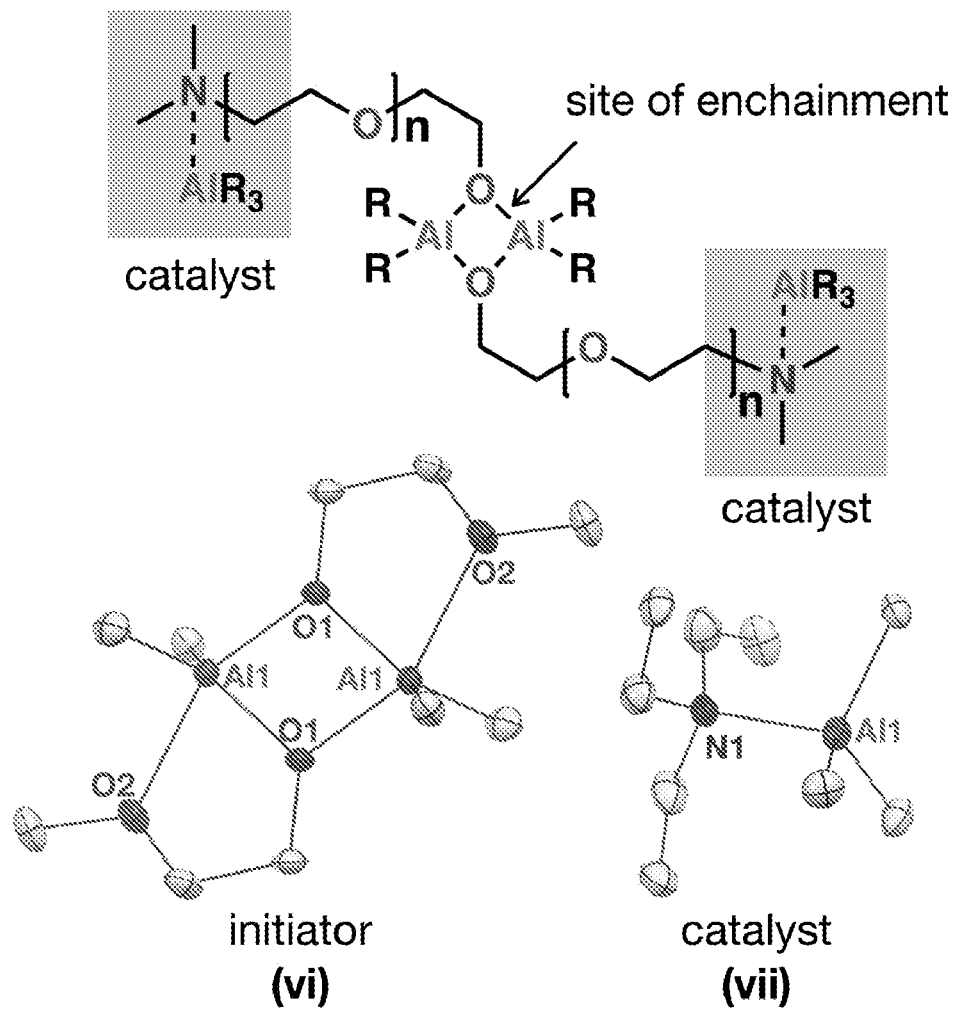
FIG. 7. The distinct catalytic and initiation/propagation functionality of (i)-(v) was separated into distinct initiator (vi) and catalyst (vii) species.

Our previously proposed mechanism for MOB-initiated polymerization of epoxides was consistent with experimental kinetic observations on a homologous series of MOB initiators with variation in alkylaluminum substitution. The polymerization rate was proposed to be covariant with the bond length between the datively bound trialkylaluminum and aluminum-alkoxide R$_3$Al-0 which was proposed to be the site of monomer enchainment. The current 170-fold enhancement in polymerization rate with a change in alkylamine substitution is inconsistent with our earlier mechanistic interpretation that presented the alkylamine as passive in the polymerization mechanism. The new results suggest an alternative hypothesis: The aluminoxane ring may be acting as initiator and the site of monomer enchainment, while the N—Al adduct, which forms upon MOB dimerization, may be acting as a catalyst as depicted in FIG. 7. Merged initiation and catalytic functionalities would help explain the precipitous increase in polymerization rate with concentration of (i) shown in FIG. 2. However, cooperativity is another possibility. To explore the possibility that the MOBs were acting as both catalyst and initiator, we decoupled the proposed initiation and catalytic moieties into discrete species.

Figure 8:
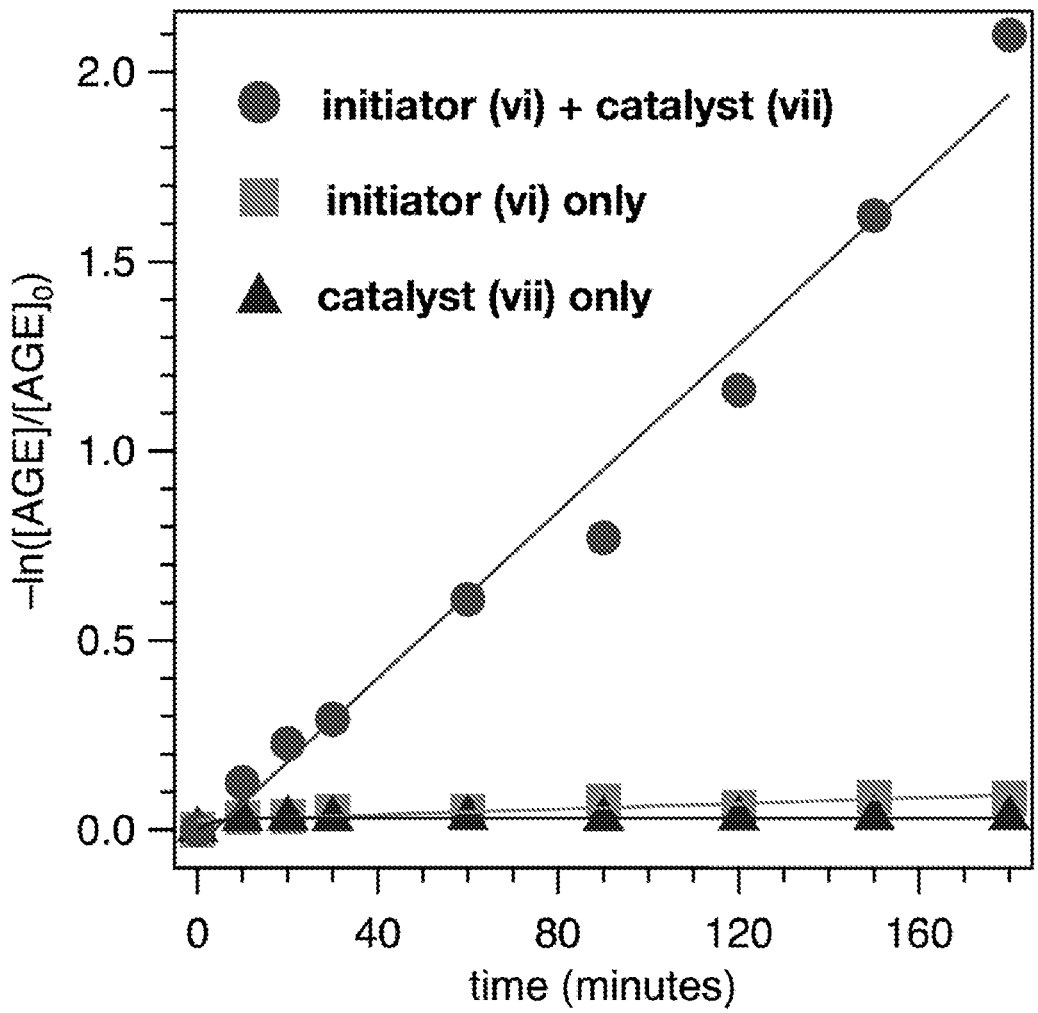
FIG. 8. A plot of $-\ln[AGE]/[AGE]_0$ as a function of time for AGE polymerizations utilized (vi) (green squares), (vii) (blue triangles) and combined (vi)+(vii) (red circles). The catalyst (vii) alone did not produce polymer. Initiator (vi) produced a slow polymerization. The polymerization rate increased precipitously when both initiator (vi) and catalyst (vii) were present.
Figure 9:
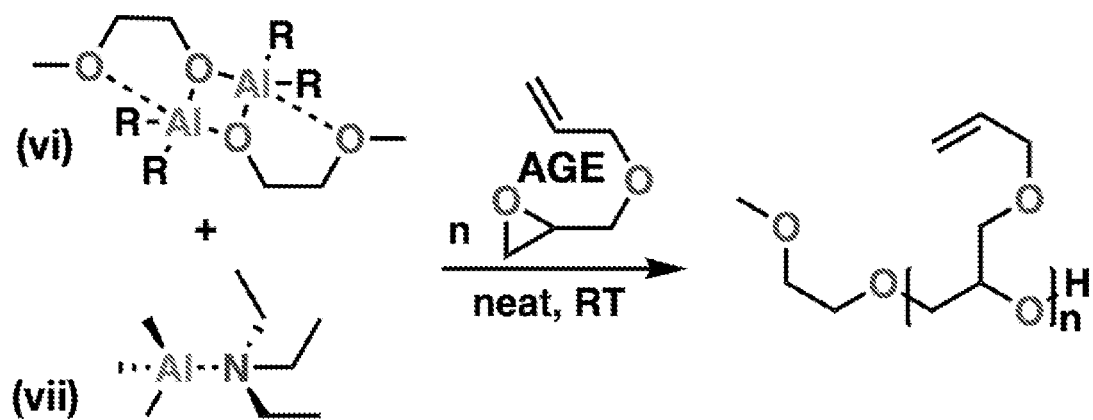
FIG. 9. Unitless concentration of monomer $[AGE]/[AGE]_0$ versus polymerization time for initiator (vi) (black triangle), and increasing equivalents of N—Al adduct catalyst (vii) relative to initiator (vi): 1.0 eq. (vii) (yellow diamonds), 2.0 eq. (vii) (blue squares), and 4.0 eq. (vii) (red circles). All polymerizations were performed in duplicate.
Figure 9:
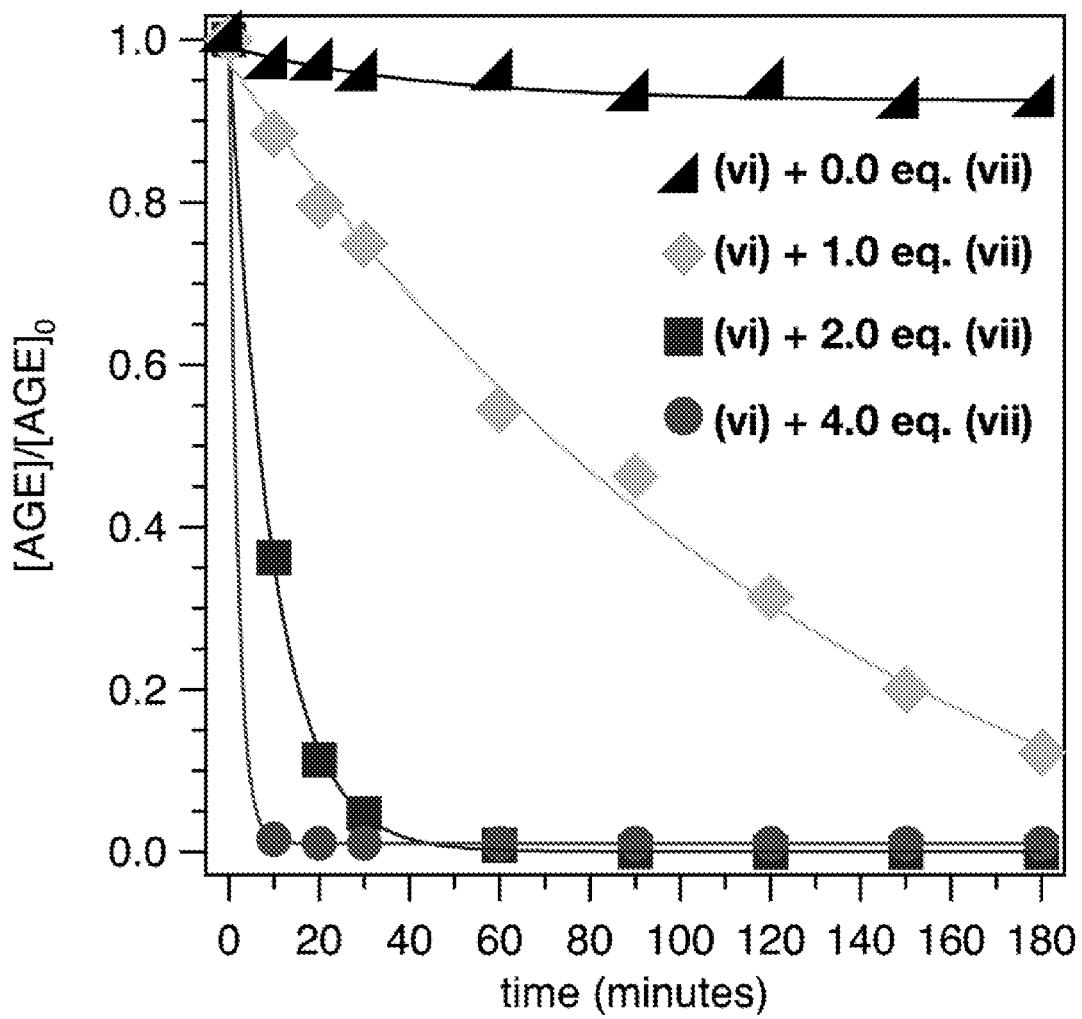

Decoupling catalytic and chain-growth functionality with distinct N—Al adduct catalysts and aluminum alkoxide initiators. An independent initiating BOD (vi) and N—Al adduct (vii) were synthesized to decouple the catalytic site from the site of chain-growth. The adduct of triethylamine and trimethylaluminum (vii) was synthesized by reacting the aforementioned compounds in hexane at −78° C. These precursors were selected for synthetic convenience. The adduct was purified via crystallization. The structure of (vii), determined by X-ray crystallography, is shown in FIG. 7. The formation of analogously stable trialkylaluminum-dialkylamine N—Al adducts has been reported previously. Density functional theory calculations at the B3LYP/6-31++g(d,p) level of theory predict a N—Al bond dissociation energy of ca. −16 kcal/mol for (vii). We synthesized a simple BOD structure (vi) in a similar manner to (v) via the reaction of methoxy-ethanol and trimethyl-aluminum, which we hypothesize would provide a site for monomer addition and end-group control. The structure of (vi) was determined by X-ray crystallography and can be seen in FIG. 7. In order to determine how these species contribute to epoxide polymerizations, we incubated (vi), (vii), and (vi)+(vii) with AGE monomer and monitored the consumption of monomer over time. FIG. 8 shows a plot of $-\ln([AGE]/[AGE]_0)$ as a function of time. The slope of the line corresponds to $k_{app}$ for the polymerization. From these data, the N—Al adduct catalyst (vii) by itself does not polymerize AGE, while the BOD (vi) initiator slowly polymerizes AGE, consistent with our previous work ($k_{app}^{(vi)}$=9.48±1.21×10$^{-6}$ s$^{-1}$). Significantly, in the presence of both (vi) and (vii), a significant increase in polymerization rate was observed. The enhanced rate was comparable to the performance of the structures (i) and (v) with $k_{app}^{(vi)+(vii)}$=1.78±0.06×10$^{-4}$ s$^{-1}$. This decisive result supports the assignment of catalytic activity to the N—Al adduct, and the site of chain growth to the aluminum alkoxide. A key advantage of decoupling the chain-growth and catalytic functionalities is the potential for orthogonal control over molecular weight and polymerization rate. In a series of duplicate AGE polymerizations targeting 10,000 g/mol, we increased the concentration of the N—Al adduct catalyst (vii) to 1.0, 2.0, and 4.0 equivalents relative to (vi) and observed a significant increase in polymerization rate (FIG. 9). The apparent rate constants increased significantly with N—Al concentration: 0.0 eq. (vii) $k_{app}^{(vi)}$>= 9.48±1.21×10$^{-6}$ s$^{-1}$, 1.0 eq. (vii) $k_{app}^{(vi)+(vii)}$=1.78±0.06×10$^{-4}$ s$^{-1}$, 2.0 eq. (vii) $k_{app}^{(vi)+2(vii)}$=17.2±0.12×10$^{-4}$ s$^{-1}$, and 4.0 eq. (vii) $k_{app}^{(vi)+4(vii)}$=69.0±10.5×10$^{-4}$ s$^{-1}$. Every added equivalent of (vii) relative to initiator (vi) produced an appreciable increase in $k_{app}$ within the range of (vii) concentrations explored. This result is reminiscent of the increase in polymerization rate seen with increasing concentration of (i) shown in FIG. 2. The resultant molecular weights conformed closely to the targeted molecular weight of 10 000 g/mol PAGE: 1.0 eq. of (vii) $M_n$=9300 g/mol, 2.0 eq. of (vii) $M_n$=8100 g/mol, and 4.0 eq. of (vii) $M_n$=7350 g/mol. The dispersities were respectively 1.34, 1.07, and 1.09. When we substituted the N—Al adduct (vii) with trimethylaluminum, we observed a slower, non-living polymerization that terminated at low conversion (ca. 35%). We speculate that the dynamic and aggregating nature of alkylaluminum species led to a gradual transformation of AlMe$_3$ into a noncatalytic form during the polymerization. The persistence of the N—Al adduct (vii) could be accounted for based on the increased stability of alkylaluminum species when coordinated by alkylamines.[39-45] $_1$H-$^1$H COSY and NOESY experiments were consistent with the persistence of the N—Al adduct in solution.

The polymerization kinetics of the N—Al adduct (vii) in the presence of the initiator were consistent with the trends observed for the compounds with tethered catalyst and initiator (i)-(v). All of the data exhibit a strong kinetic dependence on N—Al concentration, which suggests a consistent mechanism among (i)-(vii). We speculate that the high dependence of rate on catalyst concentration is due to cooperativity among N—Al species. Future work will focus on elucidating detailed structure-kinetic relationships for the N—Al adduct catalysts, and the mechanistic basis for the high dependence of rate on catalyst concentration.

A new mono(µ-oxo)-dialuminum (MOD) initiator was synthesized, which provided a considerable increase in the rate of polymerization for allyl glycidyl ether compared to previously reported homologous initiators for epoxide polymerization. New mechanistic insight was gained through isolation of a bis(μ-oxo-dialkylaluminum) (BOD) polymerization intermediate, which was corroborated by detailed NMR spectroscopy experiments. The change in structure of MOB precursor to BOD intermediate in the presence of datively coordinating moieties (e.g., epoxide, THF) and the strong dependence of polymerization rate on MOB/BOD concentration suggested the coupled catalytic and enchainment functionalities of the MOB/BOD system. This was verified by decoupling the associated moieties into distinct chemical species, which led to the isolation of a trialkylaluminum-trialkylamine (N—Al) adduct as a stable and effective catalyst for the living polymerization of epoxides. The N—Al adduct exhibited a strong dependence of polymerization rate on concentration similar to the MOB/BOD system, which suggested a consistent mechanism. The MOB initiators and N—Al adduct catalysts are unique and effective tools for the general polymerization of functional epoxides that offer control of molecular weight of structurally diverse polyethers in a short period of time under simple reaction conditions.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for ring opening polymerization, comprising contacting a substrate of Formula (I):

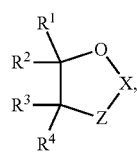

[Formula (I)]

wherein,

X is a chemical bond, C(O), or C(O)O;

when X is a chemical bond then Z is a chemical bond or the group —$CR^5R^6$—; and when X is C(O) or C(O)O then Z is a group —$CR^5R^6$— or a group of the formula —$(CH_2)_Z$—, wherein z is an integer from 0-6;

$R^1$ is selected from Rla, $OR^{1a}$, $N(R^{1a})_2$, $SiR^{1a}{}_3$, $SR^{1a}$, $SO_2R^{1a}$, $SO_2N(R^{1a})_2$, $C(O)R^{1a}$; $C(O)OR^{1a}$, $OCOR^{1a}$; $C(O)N(R^{1a})_2$, $OC(O)N(R^{1a})_2$, $N(R^{1a})C(O)N(R^{1a})_2$, F, Cl, Br, I, cyano, and nitro, wherein $R^{1a}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^2$ is selected from $R^{2a}$, $OR^{2a}$, $N(R^{2a})_2$, $SiR^{2a}{}_3$, $SR^{2a}$, $SO_2R^{2a}$, $SO_2N(R^{2a})_2$, $C(O)R^{2a}$; $C(O)OR^{2a}$, $OCOR^{2a}$; $C(O)N(R^{2a})_2$, $OC(O)N(R^{2a})_2$, $N(R^{2a})C(O)N(R^{2a})_2$, F, Cl, Br, I, cyano, and nitro, wherein $R^{2a}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^3$ is selected from $R^{3a}$, $OR^{3a}$, $N(R^{3a})_2$, $SiR^{3a}{}_3$, $SR^{3a}$, $SO_2R^{3a}$, $SO_2N(R^{3a})_2$, $C(O)R^{3a}$; $C(O)OR^{3a}$, $OCOR^{3a}$; $C(O)N(R^{3a})_2$, $OC(O)N(R^{3a})_2$, $N(R^{3a})C(O)N(R^{3a})_2$, F, Cl, Br, I, cyano, and nitro, wherein $R^{3a}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^4$ is selected from $R^{4a}$, $OR^{4a}$, $N(R^{4a})_2$, $SiR^{4a}{}_3$, $SR^{4a}$, $SO_2R^{4a}$, $SO_2N(R^{4a})_2$, $C(O)R^{4a}$; $C(O)OR^{4a}$, $OCOR^{4a}$; $C(O)N(R^{4a})_2$, $OC(O)N(R^{4a})_2$, $N(R^{4a})C(O)N(R^{4a})_2$, F, Cl, Br, I, cyano, and nitro, wherein $R^{4a}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^5$, when present, is selected from $R^{4a}$, $OR^{4a}$, $N(R^{4a})_2$, $SiR^{4a}{}_3$, $SR^{4a}$, $SO_2R^{4a}$, $SO_2N(R^{4a})_2$, $C(O)R^{4a}$; $C(O)OR^{4a}$, $OCOR^{4a}$; $C(O)N(R^{4a})_2$, $OC(O)N(R^{4a})_2$, $N(R^{4a})C(O)N(R^{4a})_2$, F, Cl, Br, I, cyano, and nitro, wherein $R^{5a}$ is in each case independently selected from hydrogen, $C_{1-8}$alkyl, $C_{2-8}$alkenyl, C2-8alkynyl, aryl, $C_{1-8}$heteroaryl, $C_{3-8}$cycloalkyl, or $C_{1-8}$heterocyclyl;

$R_6$, when present, is selected from $R^{6a}$, $OR^{6a}$, $N(R^{6a})_2$, $SiR^{6a}{}_3$, $SR^{6a}$, $SO_2R^{6a}$, $SO_2N(R^{6a})_2$, $C(O)R^{6a}$; $C(O)OR^{6a}$, $OCOR^{6a}$; $C(O)N(R^{6a})_2$, $OC(O)N(R^{6a})_2$, $N(R^{6a})C(O)N(R^{6a})_2$, F, Cl, Br, I, cyano, and nitro, wherein $R^{6a}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

wherein any two or more of $R^1$, $R^2$, $R^3$, $R^4$, $R^5$, and $R^6$ may together form a ring;

with a catalyst system comprising a catalyst of Formula II and propagator of Formula III:

wherein

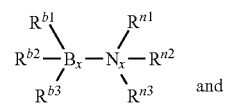

[Formula (II)]

and

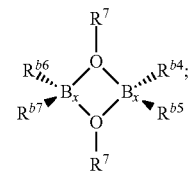

[Formula (III)]

$N_x$ is selected from N, P, As, Sn, and Pb;

$B_x$ is in each case independently selected from B, Al, Ga, In, and Th;

$R^{b1}$, $R^{b2}$, $R^{b3}$, $R^{b4}$, $R^{b5}$, $R^{b6}$, and $R^{b7}$ are independently selected from are independently selected from $C_{1-8}$alkyl; wherein any two or more of $R^{b1}$, $R^{b2}$, and $R^{b3}$; $R^{b4}$ and $R^{b5}$; or $R^{b6}$ and $R^{b7}$ may together form a ring;

$R^{n1}$, $R^{n2}$, and $R^{n3}$ are independently selected from hydrogen and $C_{1-8}$alkyl, wherein any two or more of $R^{n1}$, $R^{n2}$, and $R^{n3}$ may together form a ring;

$R^7$ is $C_{1-8}$alkyl, or wherein $R^7$ may form an $C_{2-8}$ alkyl group with one or more of $R^{n1}$, $R^{n2}$, and $R^{n3}$;

to give a ring opened polymer having the formula:

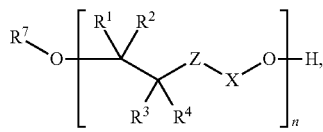

wherein n is any integer, wherein the ring opening polymerization is conducted in a polar aprotic solvent, non-polar solvent, polar protic solvent, or a combination thereof.

2. The method according to claim 1, wherein X is a chemical bond.

3. The method according to claim 1, wherein X is a chemical bond and Z is a chemical bond.

4. The method according to claim 1, wherein X is a chemical bond and Z is $CR^5R^6$.

5. The method according to claim 1, wherein Z is C(O).

6. The method according to claim 1, wherein Z is C(O) and Z is 1, 2, 3, 4, 5, or 6.

7. The method according to claim 1, wherein Z is C(O)O.

8. The method according to claim 1, wherein Z is C(O)O and Z is 1, 2, 3, 4, 5, or 6.

9. The method according to claim 1, wherein $B_x$ is in each case Al.

10. The method according to claim 1, wherein $N_x$ is in each case N.

11. The method according to claim 1, wherein the catalyst of Formula (II) has the formula:

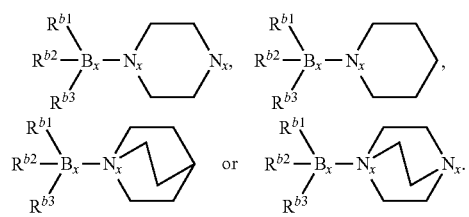

12. The method according to claim 1, wherein the mole ratio of the catalyst of Formula II and propagator of Formula III is from 1:1 to 10:1.

13. The method according to claim 1, wherein $R^7$ and $R^{n1}$ together form a $C_{2-8}$ alkyl group.

14. The method according to claim 13, wherein the catalyst system comprises an adduct of Formula (IV):

[Formula (IV)]

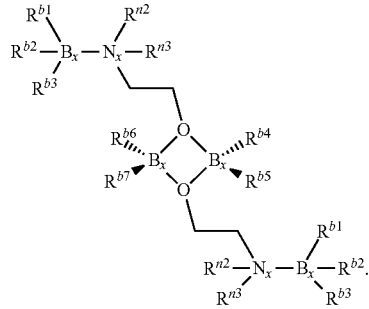

15. The method according to claim 1, wherein the ring opening polymerization is conducted in the presence of carbon dioxide.

16. The method according to claim 1, wherein the ring opening is conducted in the presence of a compound having the formula R—OH, wherein R is $C_{1-8}$alkyl, aryl, $C_{1-3}$alkaryl, or a polymer having the formula:

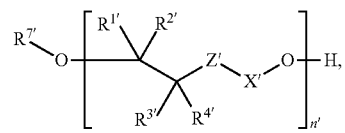

X' is a chemical bond, C(O), or C(O)O;

when X' is a chemical bond then Z' is a chemical bond or the group —$CR^{5'}R^{6'}$—; and when X' is C(O) or C(O)O then Z' is a group —$CR^{5'}R^{6'}$— or a group of the formula —$(CH_2)_{z'}$—, wherein z' is an integer from 0-6;

$R^{1'}$ is selected from $R^{1a'}$, $OR^{1a'}$, $N(R^{1a'})_2$, $SiR^{1a'}_3$, $SR^{1a'}$, $SO_2R^{1a'}$, $SO_2N(R^{1a'})_2$, $C(O)R^{1a'}$; $C(O)OR^{1a'}$, $OCOR^{1a'}$; $C(O)N(R^{1a'})_2$, $OC(O)N(R^{1a'})_2$, $N(R^{1a'})C(O)N(R^{1a'})_2$, F, Cl, Br, I, cyano, and nitro, wherein $R^{1a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^2$ is selected from $R^{2a'}$, $OR^{2a'}$, $N(R^{2a'})_2$, $SiR^{2a'}_3$, $SR^{2a'}$, $SO_2R^{2a'}$, $SO_2N(R^{2a'})_2$, $C(O)R^{2a'}$; $C(O)OR^{2a'}$, $OCOR^{2a'}$; $C(O)N(R^{2a'})_2$, $OC(O)N(R^{2a'})_2$, $N(R^{2a'})C(O)N(R^{2a'})_2$, F, Cl, Br, I, cyano, and nitro, wherein $R^{2a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^3$ is selected from $R^{3a'}$, $OR^{3a'}$, $N(R^{3a'})_2$, $SiR^{3a'}_3$, $SR^{3a'}$, $SO_2R^{3a'}$, $SO_2N(R^{3a'})_2$, $C(O)R^{3a'}$; $C(O)OR^{3a'}$, $OCOR^{3a'}$; $C(O)N(R^{3a'})_2$, $OC(O)N(R^{3a'})_2$, $N(R^{3a'})C(O)N(R^{3a'})_2$, F, Cl, Br, I, cyano, and nitro, wherein $R^{3a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^4$ is selected from $R^{4a'}$, $OR^{4a'}$, $N(R^{4a'})_2$, $SiR^{4a'}_3$, $SR^{4a'}$, $SO_2R^{4a'}$, $SO_2N(R^{4a'})_2$, $C(O)R^{4a'}$; $C(O)OR^{4a'}$, $OCOR^{4a'}$; $C(O)N(R^{4a'})_2$, $OC(O)N(R^{4a'})_2$, $N(R^{4a'})C(O)N(R^{4a'})_2$, F, Cl, Br, I, cyano, and nitro, wherein $R^{4a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^5$, when present, is selected from $R^{5a'}$, $OR^{5a'}$, $N(R^{5a'})_2$, $SiR^{5a'}_3$, $SR^{5a'}$, $SO_2R^{5a'}$, $SO_2N(R^{5a'})_2$, $C(O)R^{5a'}$; C(O)

$OR^{5a'}$, $OCOR^{5a'}$; $C(O)N(R^{5a'})_2$, $OC(O)N(R^{5a'})_2$, $N(R^{5a'})C(O)N(R^{5a'})_2$, F, Cl, Br, I, cyano, and nitro, wherein $R^{5a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

$R^6$, when present, is selected from $R^{6a'}$, $OR^{6a'}$, $N(R^{6a'})_2$, $SiR^{6a'}{}_3$, $SR^{6a'}$, $SO_2R^{6a'}$, $SO_2N(R^{6a'})_2$, $C(O)R^{6a'}$; $C(O)OR^{6a'}$, $OCOR^{6a'}$; $C(O)N(R^{6a'})_2$, $OC(O)N(R^{6a'})_2$, $N(R^{6a'})C(O)N(R^{6a'})_2$, F, Cl, Br, I, cyano, and nitro, wherein $R^{6a'}$ is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$heterocyclyl;

R7' is selected from H, $C_{1-8}$alkyl, aryl, or $C_{1-3}$alkaryl;

n' is any integer; and wherein any two or more of $R^{1'}$, $R^{2'}$, $R^{3'}$, $R^{4'}$, $R^{5'}$, and $R^{6'}$ may together form a ring.

17. The method according to claim 16, wherein the ring opening is conducted in the presence of a compound having the formula R—OH, wherein R is benzyl, and $R^{7'}$ is hydrogen or benzyl.

18. The method according to claim 16, wherein $R^{1'}$, $R^{2'}$, and $R^{3'}$ are hydrogen and $R^{4'}$ is methyl.

* * * * *